United States Patent
Singh et al.

(10) Patent No.: US 11,343,140 B2
(45) Date of Patent: *May 24, 2022

(54) METHODS AND APPARATUS TO SCALE APPLICATION DEPLOYMENTS IN CLOUD COMPUTING ENVIRONMENTS

(71) Applicant: VMware Inc., Palo Alto, CA (US)

(72) Inventors: Servesh Singh, Bangalore (IN); Arun Narayanaswamy, Bangalore (IN); Rishi Saraf, Bangalore (IN); Saket Kumar, Bangalore (IN); Jitendra Kumar, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/107,030

(22) Filed: Nov. 30, 2020

(65) Prior Publication Data

US 2021/0152423 A1    May 20, 2021

Related U.S. Application Data

(63) Continuation of application No. 16/154,352, filed on Oct. 8, 2018, now Pat. No. 10,855,534, which is a
(Continued)

(30) Foreign Application Priority Data

Jun. 26, 2014   (IN) ............................. 3120CHE2014

(51) Int. Cl.
*G06F 15/177* (2006.01)
*H04L 41/0813* (2022.01)
(Continued)

(52) U.S. Cl.
CPC ...... *H04L 41/0813* (2013.01); *G06F 9/45558* (2013.01); *H04L 41/0816* (2013.01); *H04L 41/12* (2013.01); *H04L 67/34* (2013.01)

(58) Field of Classification Search
CPC . H04L 41/0813; H04L 41/0816; H04L 41/12; H04L 67/34; G06F 9/45558
See application file for complete search history.

(56) References Cited

U.S. PATENT DOCUMENTS 6,442,584 B1    8/2002   Kolli et al.
7,296,194 B1   11/2007   Lovy et al.
(Continued)

OTHER PUBLICATIONS

Merriam-Webster, "node", 2016.
(Continued)

*Primary Examiner* — Wing F Chan
*Assistant Examiner* — Joseph R Maniwang
(74) *Attorney, Agent, or Firm* — Hanley, Flight & Zimmerman, LLC

(57) ABSTRACT

An example apparatus includes a deployment monitor to initiate a modification of a number of virtual machines deployed in the computing environment. The virtual machines including a first virtual machine to execute a first component of an application deployed in the computing environment. A dependents identifier is to identify an information dependency of a second virtual machine on information from the first virtual machine. The second virtual machine is to execute a second component of the application. An updater is to update the information dependency based on a scaling status of the first virtual machine. The information dependency in the configuration information including a reference to the first virtual machine.

20 Claims, 9 Drawing Sheets

Related U.S. Application Data continuation of application No. 14/453,656, filed on Aug. 7, 2014, now Pat. No. 10,097,410.

(51) Int. Cl.
| | |
|---|---|
| H04L 41/0816 | (2022.01) |
| H04L 41/12 | (2022.01) |
| G06F 9/455 | (2018.01) |
| H04L 67/00 | (2022.01) |

(56) References Cited

U.S. PATENT DOCUMENTS

| | | |
|---|---|---|
| 7,577,959 B2 | 8/2009 | Nguyen et al. |
| 7,689,492 B2 | 3/2010 | Coates |
| 7,716,377 B2 | 5/2010 | Harris et al. |
| 7,725,531 B1 | 5/2010 | Sood et al. |
| 7,929,420 B2 | 4/2011 | Jesuraj |
| 8,108,855 B2 | 1/2012 | Dias et al. |
| 8,250,182 B2 | 8/2012 | Frank et al. |
| 8,296,772 B2 | 10/2012 | Bulfin |
| 8,331,362 B2 | 12/2012 | Shukla et al. |
| 8,717,602 B2 | 5/2014 | Hamada |
| 8,826,272 B2 | 9/2014 | Glikson et al. |
| 8,881,145 B2 | 11/2014 | Chiueh et al. |
| 8,910,156 B1 | 12/2014 | Kenchammana-Hosekote et al. |
| 8,959,523 B2 | 2/2015 | Patil et al. |
| 9,116,753 B2 | 8/2015 | Devi |
| 9,305,010 B1 | 4/2016 | Faibish et al. |
| 9,323,576 B2 | 4/2016 | Hotra et al. |
| 9,557,879 B1 | 1/2017 | Wang et al. |
| 10,855,534 B2 | 12/2020 | Singh et al. |
| 2003/0130833 A1 | 7/2003 | Brownell et al. |
| 2003/0227392 A1 | 12/2003 | Ebert et al. |
| 2004/0010787 A1 | 1/2004 | Traut et al. |
| 2006/0155912 A1 | 7/2006 | Singh et al. |
| 2006/0271542 A1 | 11/2006 | Harris et al. |
| 2007/0106769 A1 | 5/2007 | Liu |
| 2007/0180436 A1 | 8/2007 | Travostino et al. |
| 2008/0104591 A1 | 5/2008 | McCrory et al. |
| 2008/0163171 A1 | 7/2008 | Chess et al. |
| 2008/0163194 A1 | 7/2008 | Dias et al. |
| 2008/0189468 A1 | 8/2008 | Schmidt et al. |
| 2008/0295095 A1 | 11/2008 | Watanabe et al. |
| 2009/0210869 A1 | 8/2009 | Gebhart et al. |
| 2009/0276771 A1 | 11/2009 | Nickolov et al. |
| 2009/0319906 A1 | 12/2009 | White et al. |
| 2010/0031258 A1 | 2/2010 | Takano et al. |
| 2010/0095297 A1 | 4/2010 | Sethi et al. |
| 2010/0115332 A1 | 5/2010 | Zheng et al. |
| 2010/0257263 A1 | 10/2010 | Casado et al. |
| 2011/0099403 A1 | 4/2011 | Miyata et al. |
| 2011/0153798 A1 | 6/2011 | Groenendaal et al. |
| 2011/0258621 A1 | 10/2011 | Kern |
| 2011/0286037 A1 | 11/2011 | Hamada |
| 2012/0005678 A1 | 1/2012 | Ge et al. |
| 2012/0030440 A1 | 2/2012 | Miwa et al. |
| 2012/0042033 A1 | 2/2012 | Ayala, Jr. et al. |
| 2012/0072914 A1 | 3/2012 | Ota |
| 2012/0144391 A1 | 6/2012 | Ueda |
| 2012/0151493 A1 | 6/2012 | Takase |
| 2012/0158938 A1 | 6/2012 | Shimonishi et al. |
| 2012/0180044 A1 | 7/2012 | Donnellan et al. |
| 2012/0240110 A1 | 9/2012 | Breitgand et al. |
| 2012/0303799 A1 | 11/2012 | Hadas et al. |
| 2013/0007738 A1 | 1/2013 | McCloy |
| 2013/0034021 A1 | 2/2013 | Jaiswal et al. |
| 2013/0042115 A1 | 2/2013 | Sweet et al. |
| 2013/0073473 A1 | 3/2013 | Heath |
| 2013/0073730 A1 | 3/2013 | Hansson et al. |
| 2013/0144953 A1 | 6/2013 | Watanabe |
| 2013/0159461 A1 | 6/2013 | Al Faruque et al. |
| 2013/0179289 A1 | 7/2013 | Calder et al. |
| 2013/0179876 A1 | 7/2013 | Aliminati |
| 2013/0212345 A1 | 8/2013 | Nakajima |
| 2013/0246838 A1 | 9/2013 | Reddy |
| 2013/0332590 A1 | 12/2013 | Mohaban et al. |
| 2014/0007097 A1 | 1/2014 | Chin et al. |
| 2014/0012892 A1 | 1/2014 | Jaudon et al. |
| 2014/0058871 A1 | 2/2014 | Marr et al. |
| 2014/0064056 A1 | 3/2014 | Sakata et al. |
| 2014/0068075 A1 | 3/2014 | Bonilla et al. |
| 2014/0075013 A1 | 3/2014 | Agrawal et al. |
| 2014/0082612 A1 | 3/2014 | Breitgand et al. |
| 2014/0149485 A1 | 5/2014 | Sharma et al. |
| 2014/0149591 A1 | 5/2014 | Bhattacharya et al. |
| 2014/0157264 A1 | 6/2014 | Russinovich et al. |
| 2014/0164486 A1 | 6/2014 | Ravichandran et al. |
| 2014/0173612 A1 | 6/2014 | Haydock et al. |
| 2014/0195673 A1 | 7/2014 | Cook et al. |
| 2014/0196030 A1 | 7/2014 | Deshpande et al. |
| 2014/0201157 A1 | 7/2014 | Pawar et al. |
| 2014/0237468 A1 | 8/2014 | Desai et al. |
| 2014/0280488 A1 | 9/2014 | Voit et al. |
| 2014/0290949 A1 | 10/2014 | Hall et al. |
| 2014/0304401 A1 | 10/2014 | Jagadish et al. |
| 2014/0304404 A1 | 10/2014 | Marr et al. |
| 2014/0317348 A1 | 10/2014 | Watanabe et al. |
| 2014/0379897 A1 | 12/2014 | Stroomer et al. |
| 2015/0074679 A1 | 3/2015 | Fenoglio et al. |
| 2015/0128245 A1 | 5/2015 | Brown et al. |
| 2015/0134424 A1 | 5/2015 | Matzlavi et al. |
| 2015/0143364 A1 | 5/2015 | Anderson et al. |
| 2015/0160959 A1 | 6/2015 | Bragstad et al. |
| 2015/0172205 A1 | 6/2015 | Anderson et al. |
| 2015/0178110 A1 | 6/2015 | Li et al. |
| 2015/0244803 A1 | 8/2015 | Kim et al. |
| 2015/0295792 A1 | 10/2015 | Cropper et al. |
| 2015/0355925 A1 | 12/2015 | Hiebert et al. |
| 2015/0363240 A1 | 12/2015 | Koizumi |
| 2016/0006668 A1 | 1/2016 | Shibayama et al. |
| 2016/0036838 A1 | 2/2016 | Jain et al. |
| 2016/0335111 A1 | 11/2016 | Bruun et al. |
| 2016/0344640 A1 | 11/2016 | Soderlund et al. |

OTHER PUBLICATIONS

United States Patent and Trademark Office, "Non-Final Office Action," issued in connection with U.S. Appl. No. 14/453,656, dated Apr. 1, 2016, 19 pages.

United States Patent and Trademark Office, "Final Office Action," issued in connection with U.S. Appl. No. 14/453,656, dated Nov. 3, 2016, 21 pages.

United States Patent and Trademark Office, "Non-final Office Action," issued in connection with U.S. Appl. No. 14/453,656, dated Jun. 30, 2017, 20 pages.

United States Patent and Trademark Office, "Final Office Action," issued in connection with U.S. Appl. No. 14/453,656, dated Jan. 12, 2018, 21 pages.

United States Patent and Trademark Office, "Notice of Allowance and Fee(s) Due," issued in connection with U.S. Appl. No. 14/453,656, dated Jun. 6, 2018, 22 pages.

United States Patent and Trademark Office, "Non-Final Office Action," issued in connection with U.S. Appl. No. 16/154,352, dated Oct. 2, 2019, 20 pages.

United States Patent and Trademark Office, "Final Office Action," issued in connection with U.S. Appl. No. 16/154,352, dated Apr. 8, 2020, 21 pages.

United States Patent and Trademark Office, "Notice of Allowance and Fee(s) Due," issued in connection with U.S. Appl. No. 16/154,352, dated Jul. 29, 2020, 30 pages.

METHODS AND APPARATUS TO SCALE APPLICATION DEPLOYMENTS IN CLOUD COMPUTING ENVIRONMENTS

RELATED APPLICATIONS

This patent arises from a continuation of U.S. patent application Ser. No. 16/154,352, (Now U.S. Pat. No. 10,855, 534) which was filed on Oct. 8, 2018, which was a continuation of U.S. patent application Ser. No. 14/453,656, (Now U.S. Pat. No. 10,097,410) which was filed on Aug. 7, 2014, and claimed benefit under 35 U.S.C. 119(a)-(d) to Foreign application Serial No. 3120/CHE/2014 filed in India entitled "METHODS AND APPARATUS TO SCALE APPLICATION DEPLOYMENTS IN CLOUD COMPUTING ENVIRONMENTS," filed on Jun. 26, 2014 by VMWare, Inc. U.S. patent application Ser. No. 16/154,352, U.S. patent application Ser. No. 14/453,656, and Indian Application No. 3120/CHE/2014 are hereby incorporated herein by reference in their entireties. Priority to U.S. patent application Ser. No. 16/154,352, U.S. patent application Ser. No. 14/453,656, and Indian Application No. 3120/CHE/2014 is hereby claimed.

FIELD OF THE DISCLOSURE

This disclosure relates generally to virtualized computing environments, and, more particularly, to methods and apparatus to scale application deployments in cloud computing environments.

BACKGROUND

"Infrastructure-as-a-service" (sometimes referred to as "IaaS") generally describes a suite of technologies provided by a service provider as an integrated solution to allow for elastic creation of a fully virtualized, network, and pooled computing platform (sometimes referred to as a "cloud computing platform"). Enterprises may use IaaS as a business-internal organizational cloud computing platform (sometimes referred to as a "private cloud" or a "private cloud computing platform") that gives an application developer access to infrastructure resources, such as virtualized servers, storage, and networking resources. By providing ready access to the hardware resources required to run an application, the cloud computing platform enables application developers to build, deploy, and manage the lifecycle of a virtual application (e.g., a web application, a networked application, etc.) at a greater scale and at a faster pace than before. To deploy an application, a developer, who understands the architecture of the application, must coordinate with a system administrator, who controls access to computing resources, to determine which computing resources (e.g., computing, networking, and/or storage) and/or software services (e.g., software packages) should be provisioned to support execution of the application.

DETAILED DESCRIPTION

Figure 1:
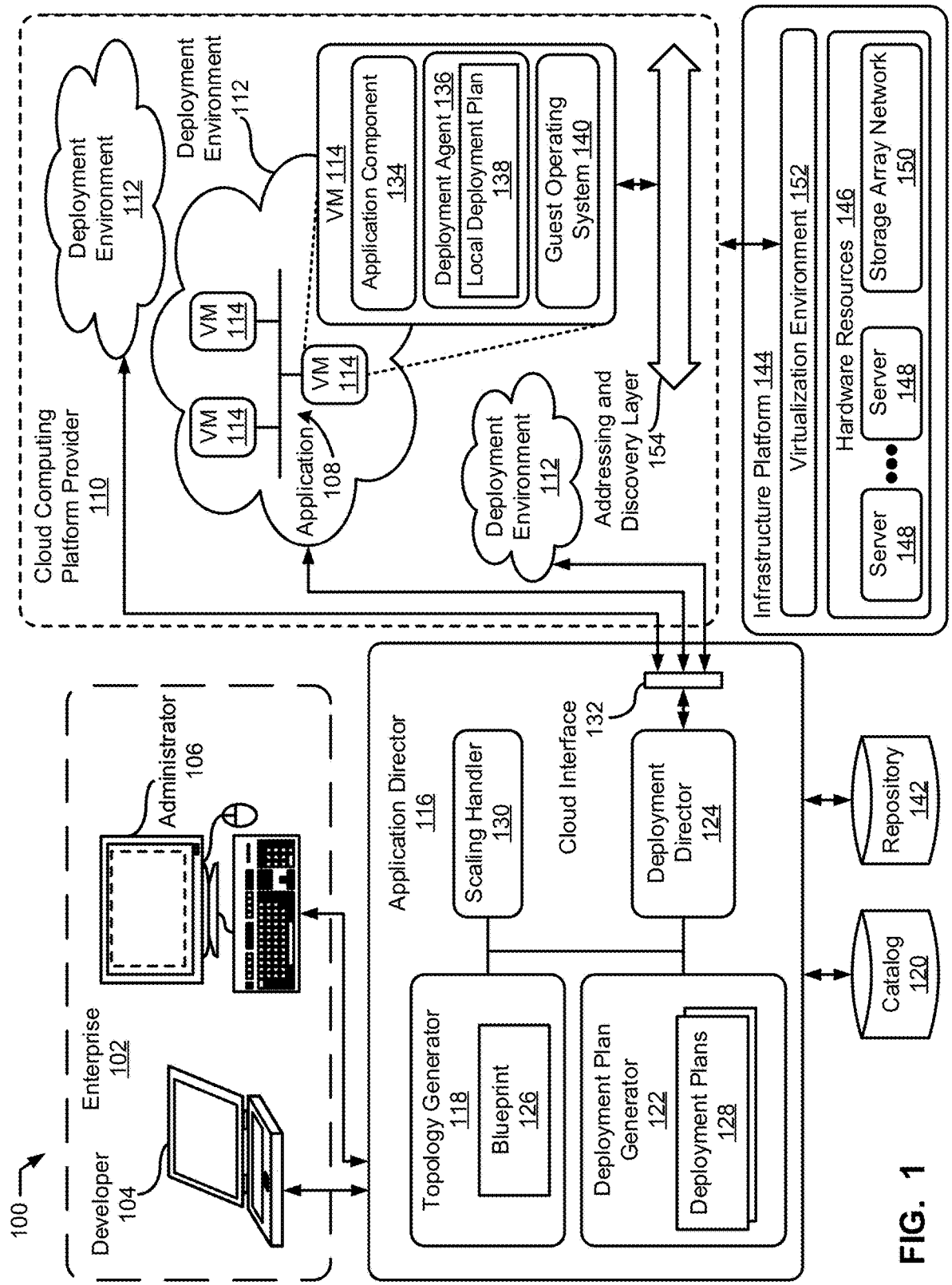
FIG. 1 is a block diagram of an example cloud computing environment constructed in accordance with the teachings of this disclosure to scale application deployments in cloud computing environments.

Applications are typically developed with a multi-tier architecture in which functions such as presentation, application processing, and data management are logically separate components. For example, an enterprise may develop a custom banking application with a multi-tier architecture including a first node implementing a cluster of application servers (e.g., JBoss Application Servers) to execute in a scalable runtime environment, a second node implementing a relational database management system (e.g., MySQL) to store account data, and a third node implementing a load balancer to distribute network traffic for robustness. Deploying a multi-tiered application in a cloud computing environment may involve a cloud computing platform provider (e.g., VMware®) providing a deployment environment to provision virtual computing resources (e.g., virtual machines (VMs)) in which an enterprise (e.g., an organization, an agency, a corporation, etc.) can deploy its application. When the application is deployed, workloads (e.g., schedules/collections of one or more processes or tasks) assigned to virtual computing resources may change over time. In situations, when workloads decrease, the enterprise may be paying for idle or underutilized virtual computing resources to which workloads are no longer assigned. In contrast, when workloads increase, the enterprise performance may decrease as a result of providing slower services to customers as the virtual computing resources are overloaded.

To more efficiently use resources in a virtual computing environment, examples disclosed herein enable scaling in and scaling out processes. For example, resources (e.g., virtual machines, networking resources, storage resources, etc.) may be allocated (e.g., scaled-out) for use by a virtual computing node when workloads increase at the computing node. In addition, resources can be freed (e.g., scaled-in) from the computing node when workloads decrease at that computing node. In this manner, resources are not inefficiently sitting idle at a virtual computing node when, for example, the node has no need for those resources. Also, the virtual computing node is allocated additional resources when needed to, for example, address increased workloads.

Examples disclosed herein include a scaling handler that scales a node (e.g., a virtual machine or a cluster of virtual machines) based on, for example, utilization of virtual computing resources. For example, referencing the custom banking application example from above, during periods of increased resource utilization (e.g., peak tax season), the scaling handler may scale-out (e.g., increase) the number of application servers included in the first node to reduce the burden of increased workloads across the node. Unlike prior systems, examples disclosed herein facilitate a scale-out operation by, for example, provisioning (e.g., allocating) one or more virtual machine(s) of a first node in the deployment environment and updating other nodes that may be dependent on the first node to include a reference to the provisioned virtual machines. For example, a load balancer may obtain configuration information from the newly provisioned virtual machines to allocate resources to them.

During periods of reduced resource utilization (e.g., post tax season), the scaling handler may scale-in (e.g., release) virtual computing resources by de-provisioning (e.g., deleting) one or more virtual machines included in the first node. Unlike prior systems, in some examples disclosed herein, when facilitating a scale-in operation, a virtual machine is selected to be de-provisioned and nodes dependent on the selected virtual machine are identified. During a scale-out, the dependent nodes are updated to clean-up any references to (e.g., disassociate the dependent nodes from) the selected virtual machine. Examples disclosed herein teardown the selected virtual machine by resource cleanup at the system level (e.g., closing connectivity connections, sending alerts to other devices, notifying other nodes, running cleanup database scripts, etc.) and/or the infrastructure level (e.g., shutting down one or more services, de-allocating disk space, etc.) before the selected virtual machine is deleted from the deployment environment.

As used herein, a node is a virtual machine and/or a cluster of virtual machines (also referred to as a "cluster node"). A virtual machine is a software stack comprising one or more operating systems, applications and/or services. As used herein, an application (also referred to herein as a "virtual application" or an "appliance") is a logical deployment unit that defines the relationship between an operating system one or more application components and/or services dependent on the operating system. An application may also define the relationship between application components that can be distributed across multiple virtual machines. As used herein, an application component refers to services and/or code components. Code components are application-specific binaries, scripts, or processes, etc., usually written by a developer and packaged into one or more files, to provide logic (e.g., relationship definitions) for an application. In some examples, code components may be a type or format of scripting and application code. Example types of code components include Java Archive (JAR) files, Java Enterprise Archive (EAR) files, Java web application archive (WAR) files, Ruby Gem packages, SQL scripts, and other suitable modules of scripting logic. Services, as used herein, are scripted software that provide a software infrastructure for an application. Services may be reused in multiple applications. Example services include application servers (e.g., Rails, Apache Tomcat, JBoss, etc.), database servers (e.g., GemFire, MySQL, SQLFire, MongoDB, Postgres, etc.), monitoring services (e.g., Hyperic, SpringInsight, etc.), web servers (e.g., Apache, VMWare vFabric Enterprise Ready Server, etc.), messaging services (e.g., RabbitMQ, etc.), middleware services, etc. As used herein, the term component generally refers to one or more of application components, code components, and/or services FIG. 1 illustrates an example cloud computing environment 100. In the illustrated example of FIG. 1, an example application 108 created by an example developer 104 is deployed for an example enterprise 102 in an example deployment environment 112 provided by an example cloud computing platform provider 110 (also referred to as a "cloud provider"). In the illustrated example, the cloud computing platform provider 110 of FIG. 1 provides multiple deployment environments 112, for example, separate deployment environments may be used for development, testing, staging, and production of the application 108. The example enterprise 102 may access services from the example cloud computing platform provider 110, for example, via a client-server communication protocol such as representational state transfer (REST) application programming interfaces (APIs). In the illustrated example of FIG. 1, the cloud computing provider 110 provisions virtual computing resources (e.g., example virtual machines 114) to provide the deployment environment 112 in which the enterprise 102 can deploy the application 108 (e.g., a multi-tiered application).

In the illustrated example of FIG. 1, the developer 104 uses an example application director 116, which may be implemented by one or more virtual machines 114, to orchestrate deployment of the application 108 into the deployment environment 112. In the illustrated example of FIG. 1, the application director 116 includes an example topology generator 118, an example deployment plan generator 122, an example deployment director 124, an example scaling handler 130, and an example cloud interface 132.

In the illustrated example of FIG. 1, the example topology generator 118 generates an example application blueprint 126 specifying a logical topology of the application 108, which is to be deployed. The example blueprint 126 maps the structure of the application 108 as a collection of nodes. Application components may be added to each node to specify which application components are executing on the node. For example, the topology generator 118 may generate a blueprint 126 (e.g., a topology map) for an online store application specifying a web application executing on an application server (e.g., an Apache Tomcat application server) that uses a data store as a database (e.g., a MongoDB). The example web application may be implemented by a Java web application archive (e.g., a "WAR" file) comprising dynamic web pages, static web pages, Java servlets, Java classes, and/or other properties, configuration information and/or resource files included in the Java web application. In the illustrated example, the blueprint 126 is an abstract representation of the structure of the application 108 including virtual machines and their corresponding application components, operating systems, dependencies and/or configurations. In some examples, the blueprint 126 standardizes the structure of an application for repeated deployments in multiple and/or diverse deployment environments. The application 108 may alternatively describe the entire online store application, including application server components and database components, rather than just the web application itself.

In the illustrated example of FIG. 1, the topology generator 118 retrieves virtual computing resources from an example catalog 120 to assemble the blueprint 126. For example, the catalog 120 may list virtual computing resources (e.g., virtual machines, networking resources, storage resources, etc.) that may be provisioned from the cloud computing platform provider 110 and corresponding application components (e.g., software services, scripts, code components, application-specific packages, etc.) that may be installed on the provisioned virtual computing resources. The example catalog 120 of the illustrated example is pre-populated with available virtual computing resources and/or application components. In some examples, an administrator 106 (e.g., an information technology (IT) administrator, a system administrator, etc.) customizes the catalog 120 by adding and/or modifying the available virtual computing resources and/or application components listed in the catalog 120. For example, the administrator 106 may enter specifications, configurations, properties, custom tasks, etc. about each entry in the catalog 120. The example blueprint 126 of the illustrated example includes an installation order for the application components during deployment. For example, the blueprint 126 may define dependencies between one or more of the application components. For example, the developer 104 may specify a dependency from an Apache service (e.g., a load balancer) to an application code package such as a web application. In some such examples, the dependency may be that the load balancer may not be configured until installation of the web application is complete.

In the illustrated example of FIG. 1, the deployment plan generator 122 generates an example deployment plan 128 based on the blueprint 126. The example deployment plan 128 includes deployment settings (e.g., state information such as virtual computing resource cluster sizes, processing resources, memory, networking resources, etc.) and an execution plan identifying tasks having an order in which virtual computing resources are provisioned and application components are installed, configured, and started. The example deployment plan 128 of the illustrated example is a process-oriented view of the blueprint 126. For example, the administrator 106 may follow discrete steps included in the deployment plan 128 to deploy the application 108. In some examples, different deployment plans 128 may be generated from a single blueprint 126 to test prototypes (e.g., new application versions), to scale (e.g., scale-out or scale-in) deployments, and/or to deploy the application 108 to different deployment environments (e.g., testing environments, staging environments, production environments, etc.).

In the illustrated example, the deployment plan generator 122 generates the deployment plan 128 in response to user input (e.g., from the developer 104) to initiate a deployment process for the application 108 in a specified deployment environment 112. In some examples, the deployment plan generator 122 allows the administrator 106 to insert one or more custom tasks in the deployment plan 128. For example, custom tasks may be scripts that, when executed by a virtual machine, perform operations that facilitate deployment of the application 108, including, for example, monitoring tasks, e-mail and alert notification tasks, operations that pre-configure a virtual machine, operations performed prior to provisioning a virtual machine, and other scripting operations.

The example deployment director 124 of FIG. 1 orchestrates execution of the example deployment plan 128 for the application 108 in coordination with the example virtual machines 114 included in the deployment. The example deployment director 124 communicates with the cloud computing platform provider 110 via the example cloud interface 132 to provision and configure the example virtual machines 114 in the deployment environment 112, as specified by the deployment plan 128. In some examples, the deployment director 124 separates the deployment plan 128 into local deployment plans for each virtual machine 114. In the illustrated example, the deployment director 124 maintains a central state of the deployment process that specifies the dependencies at deployment time between tasks to be performed across the virtual machines 114 in a specified order. For example, the deployment director 124 may send a message to one or more of the virtual machines 114 when deployment-time dependencies in their respective local deployment plans are satisfied.

In some examples, the deployment director 124 monitors the status of the virtual machines 114 and may perform a heartbeat procedure when a virtual machine is unresponsive (e.g., due to host failure, networking failure, etc.). The example deployment director 124 initiates a "timeout" interval for the virtual machines 114 that defines a maximum amount of time before a virtual machine is deemed "timed out" and is checked for failure. When the "timeout" interval expires, the example deployment director 124 sends a heartbeat message to the "timed out" virtual machine. For example, the heartbeat message may request that the "timed out" virtual machine respond with status and task updates (e.g., within one minute of the heartbeat).

The example scaling handler 130 of FIG. 1 facilitates scaling of an application deployed in the deployment environment 112. The scaling handler 130 of the illustrated example performs monitoring and modifying operations on the deployment (e.g., scale-in, scale-out, update, etc.).

The example scaling handler 130 monitors resource utilization (e.g., computer processing) in the deployment environment 112 and initiates a scaling operation in response to obtained resource utilization information. For example, the scaling handler 130 may dynamically initiate a scale-out operation when resource utilization of a workload increases, and/or initiate a scale-in operation when resource utilization of the workload decreases.

In some other examples, the scaling handler 130 initiates a scaling operation (e.g., scale-in or scale-out) based on a schedule. For example, the scaling handler 130 may initiate a first scale-out operation at 8:00 AM on weekdays to increase a number of web servers deployed in the deployment environment 112 from, for example, three web servers to, for example, seven web servers and/or initiate a second scale-out operation at 9:00 PM on Sundays to return the number of web servers deployed in the deployment environment 112 from two web servers (e.g., where the deployment environment was previously scaled-in to two web servers) to three web servers. The example scaling handler 130 may additionally or alternatively initiate a first scale-in operation at 5:00 PM on weekdays to return the number of web servers deployed in the deployment environment 112 from seven web servers to three web servers, the scaling handler 130 may initiate a second scale-in operation to decrease the number of web servers deployed in the deployment environment 112 from three web servers to two web servers, etc.

In the illustrated example of FIG. 1, the cloud interface 132 provides a communication abstraction layer by which the application director 116 may communicate with, for example, a heterogeneous mixture of cloud provider(s) 110 and deployment environment(s) 112. In the illustrated example, the deployment director 124 provides the virtual machines 114 with a series of tasks specific to the respective virtual machines 114 (e.g., the example local deployment plan 138). The tasks may be scripts that are executed by the respective virtual machines 114 to install, configure, and/or start one or more application components 134. For example, a task may be a script that, when executed by the virtual machines 114, causes the respective virtual machines 114 to retrieve and install particular software packages from an example central package repository 142. In the illustrated example, the deployment director 124 coordinates with the virtual machines 114 to execute the tasks in an order that observes installation dependencies between the virtual machines 114 according to the deployment plan 128.

In the illustrated example of FIG. 1, the cloud computing platform provider 110 utilizes an infrastructure platform 144 upon which the deployment environment 112 may be executed. The infrastructure platform 144 of the illustrated example includes example hardware resources 146, such as example servers 148 (e.g., hardware servers), networking hardware and one or more example storage array networks 150, to provide an example virtualization environment. The example virtualization environment 152 (also referred to as a hypervisor or a virtual machine monitor) facilitates execution of the virtual machines 114 across the servers 148. As discussed in more detail below, the virtual machines 114 provide the virtual computing resources (e.g., computing resources, networking resources, storage resources, etc.) that comprise the deployment environment 112. Example implementations of the virtualization environment 152 include VMware ESX™ based hypervisor technologies provided by VMware, Inc., the Xen® Hypervisor provided by The Linux Foundation, Hyper-V virtualization technologies Microsoft® software, etc.

In the illustrated example of FIG. 1, the virtualization environment 152 facilitates providing resources of the infrastructure platform 144 to the deployment environment 112. The virtualization environment 152 instantiates virtual machines according to a cloud template that defines a virtual machine having specified virtual computing resources. For example, a cloud template may comprise metadata that describes the configuration of a virtual machine including computing resources, networking resources, storage resources, etc., and other supporting libraries pre-installed and/or available for use to repeatedly create a virtual machine having the specified settings.

In the illustrated example of FIG. 1, the virtual machines 114 are hosted by (e.g., executing within) the virtualization environment 152 on one or more of the example servers 148. For example, the virtualization environment 152 may provide resources for the example deployment environment 112 within which one or more of the virtual machines 114 may be concurrently instantiated and/or executed. In some examples, the visualization environment 152 virtualizes resources equivalent to the example hardware resources 146. For example, the virtualization environment 152 may emulate hardware such as virtual hard drives, virtual networking resources, virtual processors, virtual memory, etc. for use by the virtual machines 114.

In the illustrated example of FIG. 1, the virtualization environment 152 facilitates executing operating systems (e.g., Microsoft Windows®, Linux®, Solaris® x86, Netware, FreeBSD, etc.), and the virtualization environment 152 may include one or more guest operating systems 140 to execute application components 134. Although the example virtual machines 114 of FIG. 1 include one application component 134, the virtual machines 114 may not include any application components or may include any suitable number of application components such as two, three, or four, etc.

The example virtual machines 114 of the illustrated example include a pre-installed bootstrap script that, upon first boot, retrieves an example deployment agent 136 (e.g., packaged as a JAR file) from the example deployment director 124. Alternatively, the deployment agent 136 may be pre-installed on the virtual machine 114. In the illustrated example of FIG. 1, the deployment agent 136 obtains a local deployment plan 138 from the deployment director 124 and executes the local deployment plan 138 in coordination with the deployment director 124.

In the illustrated example of FIG. 1, the example deployment agent 136 is a process or daemon that communicates with the example deployment director 124. For example, the deployment agent 136 may communicate with the deployment director 124 via an example addressing and discovery layer 154 to obtain the example local deployment plan 138. The example deployment agent 136 of the illustrated example facilitates executing scripts representative of tasks included in the local deployment plan 138 in coordination with the deployment director 124. For example, executing scripts may include retrieving, unpacking, installing, and/or configuring application component packages. In the illustrated example, the application component packages include a plurality of files, similar to those in a WAR file, organized into a tape archive file or a "tar" file, and that may be retrieved via download from, for example, a Git repository, a package manager, and/or other application component resources. In some examples, the deployment agent 136 may provide execution status to the deployment director 124 for tasks that have been successfully executed on the virtual machine 114. In the illustrated example, the deployment agent 136 responds to a heartbeat message received from the deployment director 124 via, for example, the addressing and discovery layer 154.

In the illustrated example of FIG. 1, the example addressing and discovery layer 154 provides a common interface through which components of the example deployment environment 112 can communicate and receive notifications. For example, the deployment director 124 may communicate through the addressing and discovery layer 154 to broadcast the example local deployment plans 138 during deployment of web applications in the deployment environment 112. In some examples, the virtual machines 114 may broadcast a notification through the example addressing and discovery layer 154 to poll for permission to execute a task from the local deployment plan 138 and/or to indicate successful execution of a task from the local deployment plan 138.

The example addressing and discovery layer 154 of the illustrated example is implemented as a message brokering service (e.g., running in one or more virtual machines) defining a common protocol and message format through which components of the deployment environment 112 can exchange messages and broadcast notifications and/or other information. In some such examples, the components of the example deployment environment 112 may establish a connection with the message brokering service (e.g., also referred to as "subscribing" to the message brokering service), for example, through known authentication techniques (e.g., passwords, etc.). Once connected to the message brokering service, the components of the example deployment environment 112 can provide, receive and/or request messages, notifications and/or other similar information to and/or from other components that have also subscribed to the message brokering system.

An example message brokering system that may be used in the example cloud computing environment 100 of FIG. 1 is RabbitMQ™, which is based on the advanced message queuing protocol (AMPQ) open protocol standard. However, other interfaces and/or communication schemes through which components may communicate and/or receive notifications may additionally or alternatively be used. As used herein, the phrase "in communication," including variances thereof, encompasses direct communication and/or indirect communication through one or more intermediary components. Indirect communication does not require direct physical (e.g., wired) communication and/or constant communication, but rather additionally includes selective communication at periodic intervals, scheduled intervals, manual intervals, aperiodic intervals and/or one-time events.

As described above, FIG. 1 depicts the example cloud computing environment 100 in which a deployed application can be scaled (e.g., scaled-out or scaled-in) within the deployment environment 112. The example scaling handler 130 monitors the deployment of the application 108 in the deployment environment 112 and initiates a scaling operation based on resource utilization of the application 108 and/or scheduled scaling times. During a scale-out operation, the scaling handler 130 allocates necessary resources for the additional virtual machine(s) 114 in accordance with the blueprint 126 generated for the application 108. During a scale-in operation, the scaling handler disassociates selected ones of the virtual machines 114 from the deployment and maintains dependencies between resources in accordance with the blueprint 126 generated for the application 108. Accordingly, the scaling handler 130 is able to update (e.g., scale-in or scale-out) the application based on actual resource utilization and with limited user input. The scaling handler 130 is described in further detail in conjunction with FIG. 3.

Figure 2:
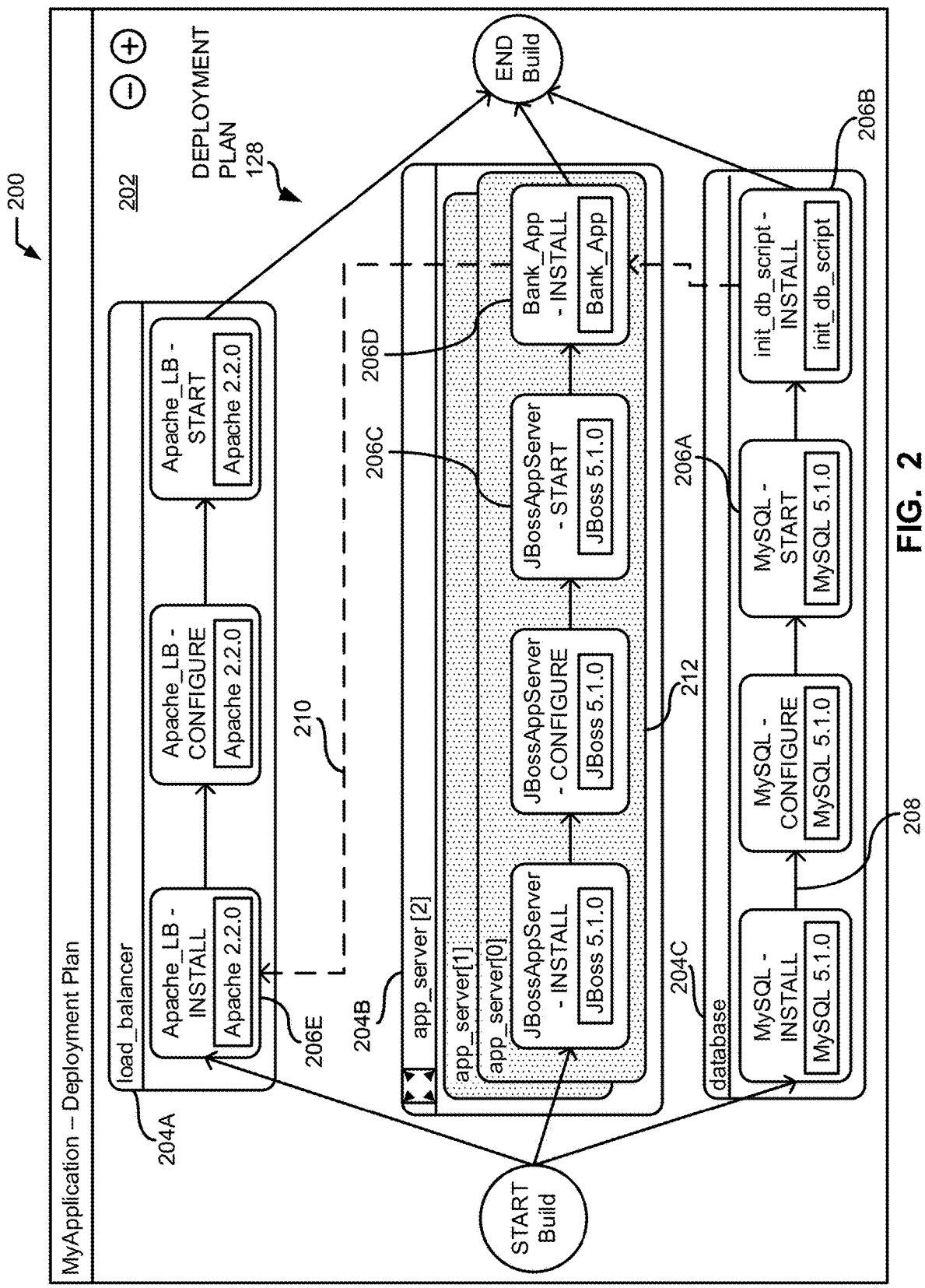
FIG. 2 illustrates an example graphical user interface generated by the example application director of FIG. 1 to generate an application blueprint for an application.

FIG. 2 shows an example user interface 200 for displaying a representation of the example deployment plan 128 for a three-tiered application. The example user interface 200 is presented by the example deployment plan generator 122 of FIG. 1. In the illustrated example of FIG. 2, the user interface 200 includes a canvas 202 presenting example nodes 204 (e.g., an example load balancer node 204A, an example application server node 204B executing a web application (e.g., "bank_app"), and an example MySQL database node 204C), which represent example virtual machines 114 provisioned in the example deployment environment 112. In the illustrated example, each node 204A, 204B, 204C includes tasks (e.g., an example task 206A, an example task 206B, an example task 206C, an example task 206D and an example task 206E) representing action scripts to be executed on the corresponding virtual machine 114.

As discussed above, when the example developer 104 (FIG. 1) develops the application blueprint 126 for the application 108, the developer 104 may specify one or more dependencies between application components to declare a relationship between the application components. Dependencies may be used to plan deployment of the application 108 by defining a deployment order for application components (e.g., that indicates whether deployment tasks for one item will wait to run until the tasks for the other item has finished).

Dependencies are identified by the developer 104 by, for example, defining them in the catalog 120. A dependency may be an intra-node dependency or an inter-node dependency. A dependency between application components may be defined between application components in the same node (e.g., an "intra-node" dependency) to represent that, at that node, tasks for one application component are performed after tasks for the other application component. In the illustrated example, intra-node dependencies are illustrated by solid directional lines between two tasks. Alternatively, dependencies between application components may be defined between application components in different nodes (e.g., "inter-node" dependencies) such that tasks for an application component at a first node are performed after tasks of an application component at a second node have been completed. In the illustrated example, inter-node dependencies are illustrated by dashed directional lines between two tasks.

In the illustrated example of FIG. 2, the deployment plan 128 of FIG. 2 specifies that a task does not begin execution until a preceding task, as indicated by solid directional lines 208, has been completed. For example, a virtual machine (labeled as "database") executes action scripts for installing (e.g., "MySQL—INSTALL"), configuring (e.g., "MySQL—CONFIGURE"), and starting (e.g., "MySQL—START") a MySQL database service. Because of the dependency implied between the MySQL database and SQL script (e.g., the SQL script may not be executed before the MySQL database is deployed), the example task 206B for executing the "init_db_script" SQL script (e.g., "init_db_script—INSTALL") is placed after the last task for deploying the MySQL database (e.g., "MySQL—START") (e.g., the example task 206A) has been completed. Similarly, the example task 206D for deploying the bank application (e.g., "Bank_App—INSTALL") is placed after the last task for deploying the application server (e.g., "JBossAppServer—START") (e.g., the example task 206C) has been completed.

In the illustrated example of FIG. 2, the deployment plan 128 also specifies inter-node dependencies between the nodes, as indicated by a dashed directional line 210. For example, since a load balancer usually cannot be configured until a web application is running, in the three-tiered application 108 of FIG. 2, the example deployment plan 128 specifies that the example task 206E for deploying the load balancer (e.g., "Apache_LB—INSTALL") does not begin execution until the example task 206D for deploying the web application (e.g., "bank_app—INSTALL") is completed.

The cluster of the virtual machines 114 are represented by a single node 204B in the illustrated example. For example, the example cluster node 212 of FIG. 2 includes two sub-nodes (e.g., "app server[0]" and "app server[1]"). In some examples, the sub-nodes may include additional sets of deployment-time dependencies. For example, the deployment plan 128 may indicate that the task 206D (e.g., "Bank_App—INSTALL") complete in all sub-nodes (e.g., "app server[0]" and "app server[1]") before the task 206E (e.g., "Apache_LB—INSTALL") may begin. Alternatively, each virtual machine in a cluster of the virtual machines 114 may be represented by a separate node.

Figure 3:
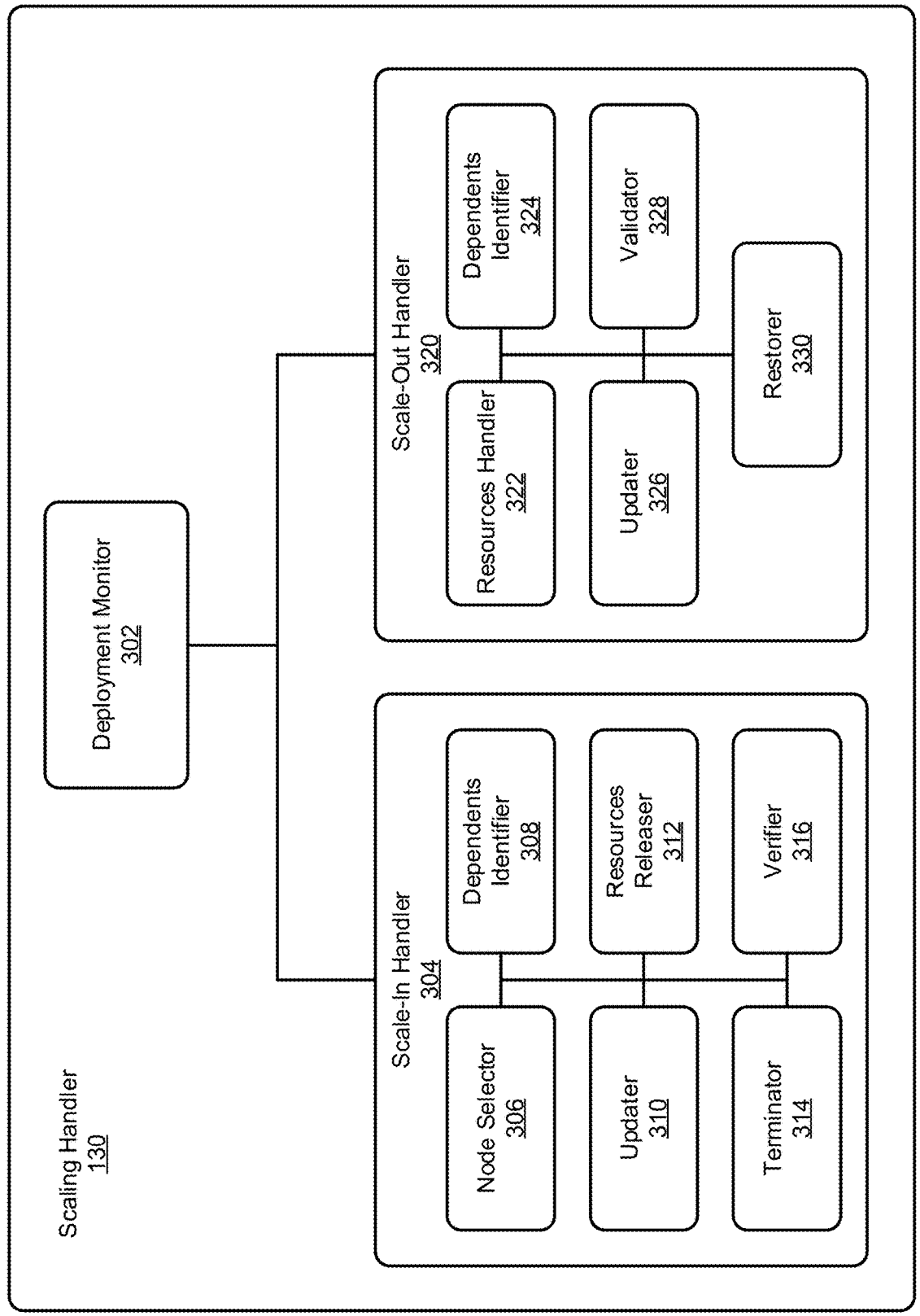
FIG. 3 is a diagram of the example scaling handler of FIG. 1.

FIG. 3 is a block diagram of an example implementation of the scaling handler 130 of FIG. 1. In the illustrated example of FIG. 3, the example scaling handler 130 controls scaling of application deployments in the deployment environment 112 of FIG. 1. The example scaling handler 130 of FIG. 3 includes an example deployment monitor 302, an example scale-in handler 304 and an example scale-out handler 320.

In the illustrated example of FIG. 3, the example deployment monitor 302 monitors deployment environments (e.g., dependent environment 112 of FIG. 1) and determines whether to initiate a scaling operation and to what extent. For example, the deployment monitor 302 may monitor infrastructure resource consumption levels and requirements (e.g., workload) of the deployed application 108 in the deployment environment 112. In some examples, the deployment monitor 302 may compare resource utilization by the application 108 workload to utilization ranges. For example, the deployment monitor 302 may initiate a scale-in operation when resource utilization by the workload is in a first range (e.g., less than 25% utilization), may initiate a scale-out operation when resource utilization by the workload is in a second range (e.g., greater than 75% utilization), and may perform no scaling operation when resource utilization by the workload is in a third range (e.g., greater than or equal to 25% utilization and less than or equal to 75% utilization). In some examples, the deployment monitor 302 may compare the workload to one or more thresholds and scale the number of virtual machines (e.g., sub-nodes) executing the workload accordingly (e.g., increase or decrease the cluster size of a node).

For example, when the deployment monitor 302 of the illustrated example determines that the resource utilization by the workload satisfies a first threshold, the example deployment monitor 302 initiates a scale-out operation to add (e.g., provision) one or more virtual machines to the deployment environment. For example, the example deployment monitor 302 may initiate a first scale-out operation to provision one additional virtual machine 114 when resource utilization by the workload exceeds 75% of available resources, the example deployment monitor 302 may initiate a second scale-out operation to provision a second virtual machine 114 when resource utilization by the workload exceeds 85% of available resources, etc.

When the deployment monitor 302 of the illustrated example determines that resource utilization by the workload satisfies a second threshold, the example deployment monitor 302 initiates a scale-in operation to remove (e.g., de-provision) one or more virtual machines from the deployment environment. For example, the deployment monitor 302 may initiate a first scale-in operation to de-provision a first virtual machine 114 when resource utilization by the workload is less than 25% of available resources, the deployment monitor 302 may initiate a second scale-in operation to de-provision a second virtual machine 114 when resource utilization by the workload is less than 15% of available resources, etc. In some examples, the utilization records and/or the resource utilization thresholds are stored in a data structure such as a lookup table. In some examples, the utilization records and/or the resource utilization thresholds may be changed by the developer 104, the administrator 106 and/or any other person.

The deployment monitor 302 of the illustrated example may initiate a scaling operation according to a schedule. For example, the deployment monitor 302 may initiate a scale-out operation during work hours and may additionally or alternatively initiate a scale-in operation during night-time hours. In some examples, the deployment monitor 302 initiates a scaling operation based on, for example, a combination of resource utilization and timing intervals. For example, the deployment monitor 302 may initiate a scaling operation when the deployment monitor 302 determines that resource utilization satisfies a third threshold for a time interval (e.g., a minimum time interval). In some such examples, combining resource utilization and timing intervals may be beneficial in reducing the number of false positives due to, for example, spikes and/or surges in electricity or activity. For example, the deployment monitor 302 may initiate a scaling operation when resource utilization is greater than the first threshold for thirty seconds (e.g., thirty continuous seconds, at least thirty seconds during a sixty second running window, etc.), and, thereby reducing the number of scale-out operations initiated due to a temporary (e.g., less than thirty seconds) spike and/or surge in electricity or activities.

In the illustrated example of FIG. 3, the scaling handler 130 includes the example scale-in handler 304 to execute scale-in operations. For example, the scale-in handler 304 may obtain a message from the example deployment monitor 302 to initiate a scale-in operation when, for example, the infrastructure resource consumption levels and requirements are less than a threshold. The example scale-in handler 304 includes an example node selector 306, an example dependents identifier 308, an example updater 310, an example resources releaser 312, an example terminator 314 and an example verifier 316.

In the illustrated example of FIG. 3, the example node selector 306 selects one or more of the virtual machines 114 to de-provision from the deployment environment 112. For example, the node selector 306 may change a scaling status of the selected one or more of the virtual machines 114 to identify the virtual machines 114 selected for removal from the deployment. For example, the node selector 306 may change the scaling status of a selected node from "deployed" to "to delete." The example node selector 306 of the illustrated example selects the one or more virtual machines 114 using algorithms such as last-in first out (LIFO), first-in first-out (FIFO), randomizer, etc. Additionally or alternatively, the node selector 306 may enable a user (e.g., the administrator 106) to manually select one or more virtual machines 114 to delete.

The example dependents identifier 308 of FIG. 3 identifies one or more virtual machines and/or nodes dependent on the virtual machines 114 selected by the node selector 306. The example dependents identifier 308 parses the blueprint 126 and/or the deployment plan 128 and to identify which, if any, virtual machines and/or nodes obtain information from a selected one of the virtual machines 114 and/or provide information to the selected one of the virtual machines 114.

The example updater 310 of the illustrated example updates the one or more virtual machines that depend from the selected one of the virtual machines 114. For example, the updater 310 may parse through the configurations and properties of the dependent virtual machines and remove references to the selected one of the virtual machines 114. In some examples, the updater 310 may replace the removed values with references to, for example, a cloud manager that manages the configurations in a deployment environment (e.g., the deployment environment 112 of FIG. 1). That is, the example updater 310 illustrated in FIG. 3 disassociates the selected one of the virtual machines 114 from the remaining virtual machines 114 in the deployment environment.

In the illustrated example of FIG. 3, the example resources releaser 312 performs a resource cleanup for the ones of the virtual machines 114 selected by the node selector 306 (e.g., virtual machines marked "to delete"). The example resources releaser 312 performs application-level cleanup by, for example, closing connectivity connections, sending alerts to other services, running cleanup database scripts on the database, notifying other nodes, etc. Additionally or alternatively, the example resources releaser 312 may perform infrastructure level cleanup by, for example, shutting down services, de-allocating disk space, returning resources (e.g., storage, IP address, etc.) used by the deleted ones of the virtual machines 114 to their respective resource pools.

In the illustrated example of FIG. 3, the example terminator 314 terminates the selected ones of the virtual machines 114 from the deployment environment 112 by initiating a shutdown sequence. For example, the terminator 314 may cause (e.g., force) ones of the virtual machines 114 marked "to delete" to shut down. The example terminator 314 of FIG. 3 then deletes the virtual machine, which results in a lesser number of total virtual machines 114 in the deployment environment 112.

In the illustrated example of FIG. 3, the example verifier 316 verifies that the scale-in operation completed successfully. For example, the verifier 316 may coordinate with the example deployment director 124 (FIG. 1) to ensure the current set of virtual machines 114 deployed in the deployment environment 112 does not include the selected ones of the virtual machines 114 and/or references to the selected ones of the virtual machines 114. A scale-in operation may be unsuccessfully performed when, for example, a transient error in a connection between the example application director 116 and the example cloud computing platform provider 110 results in the terminator 314 executing the delete task, but the corresponding virtual machine(s) 114 not being deleted in the deployment environment 112. When the verifier 316 determines that deletion of the selected ones of the virtual machines 114 was unsuccessful, the example verifier 316 initiates the example terminator 314 to retry deleting the selected virtual machine. In some examples, the verifier 316 may include a counter to monitor the number of retry attempts. When the example verifier 316 of the illustrated example is unable to verify that the scale-in handler 304 successfully executed the scale-in operation, including removing the selected ones of the virtual machines 114 from the deployment environment 112, the verifier 316 alerts the user via, for example, audio and/or visual notifications.

The example scaling handler 130 of FIG. 3 includes the example scale-out handler 320 to execute scale-out operations. For example, the scale-out handler 320 may obtain a message from the example deployment monitor 302 to initiate a scale-out operation when, for example, the infrastructure resource consumption levels and requirements exceed a threshold. The example scale-out handler 320 includes an example resources handler 322, an example dependents identifier 324, an example updater 326, an example validator 328 and an example restorer 330.

In the illustrated example of FIG. 3, the example resources handler 322 manages the provisioning of virtual machines and their resources in the deployment environment 112. The example resources handler 322 may obtain a message indicative of a number of virtual machines 114 to scale-out the deployed application 108. The example resources handler 322 may then initiate and manage the instantiation of the specified number of virtual machines. For example, the resources handler 322 may provide and allocate infrastructure resources for creating a virtual machine in the deployment environment 112. The example resources handler 322 of the illustrated example downloads components on to the newly instantiated ones of the virtual machines 114 and/or installs the component services on the instantiated ones of the virtual machines 114. In some examples, the resources handler 322 may configure the instantiated ones of the virtual machines 114. The example resources handler 322 of FIG. 3 then restarts the instantiated ones of the virtual machines 114 to "clean-up" (e.g., remove) any components leftover from the provisioning of the instantiated ones of the virtual machines 114, causes the instantiated ones of the virtual machines 114 to execute the deployed application 108, and sets the scaling status of the instantiated ones of the virtual machines 114 to "new."

In the illustrated example of FIG. 3, the example dependents identifier 324 identifies one or more virtual machines 114 and/or nodes that the newly instantiated ones of the virtual machines 114 may depend on and/or that may depend on the newly instantiated ones of the virtual machines 114. For example, the dependents identifier 324 may parse the blueprint 126 and/or the deployment plan 128 and identify which, if any, of the virtual machines 114 and/or nodes from which the instantiated ones of the virtual machines 114 obtains information from and/or provides information.

In the illustrated example of FIG. 3, the example updater 326 updates the one or more of the virtual machines 114 that have been identified as dependent by the dependents identifier 324. For example, the updater 326 may parse through the configurations and properties of the dependent virtual machines and add references to the newly instantiated ones of the virtual machines 114. The example updater 326 also provides references such as an IP address, a hostname, etc. associated with the instantiated ones of the virtual machines 114 to other virtual machines and/or nodes in the deployment environment 112. In some examples, the updater 326 may provide the newly instantiated ones of the virtual machines 114 with references to, for example, a cloud manager that manages the configurations in the deployment environment 112.

In the illustrated example of FIG. 3, the example validator 328 verifies that the scale-out operation successfully completed. For example, the validator 328 may determine whether the newly instantiated ones of the virtual machines 114 are associated (e.g., in communication) with the other components of the deployed application 108, may coordinate with the example deployment director 124 to ensure the current set of virtual machines 114 deployed in the deployment environment 112 includes the newly instantiated ones of the virtual machines 114, etc. The example validator 328 of the illustrated example verifies the integrity of the deployment by, for example, determining whether the deployed application 108 has errors (e.g., whether properties of the deployed application 108 have been correctly specified, whether the deployment includes invalid (e.g., circular) dependencies, etc.). In some examples, the validator 328 may change the scaling status of the newly ones of the virtual machines 114 from "new" to "deployed" when the scale-out operation was successful.

When the example validator 328 of the illustrated example determines that the scale-out operation was unsuccessful, the validator 328 initiates the example restorer 330 to restore the system state of the deployment environment to the state that existed before the scale-out operation was unsuccessfully attempted. The example restorer 330 of the illustrated example performs a resource "cleanup" of the partially created virtual machines and then restores the system configuration to its original state. To this end, when the example scale-out handler 320 is initiated to perform a scale-out operation (e.g., by the deployment monitor 302), the example restorer 330 creates a snapshot of the original state of the deployment environment 112 prior to performing the scale-out operation. The example restorer 330 uses the snapshot of the original state to restore the system configuration to its original state. The example restorer 330 may monitor the number of unsuccessful scale-out operation attempts and alert the user when a threshold is satisfied. For example, after a third unsuccessful attempt to recover the original deployment, the restorer 330 may output audio and/or visual notifications that the scale-out operation cannot be completed.

While an example manner of implementing the scaling handler 130 of FIG. 1 is illustrated in FIG. 3, one or more of the elements, processes and/or devices illustrated in FIG. 3 may be combined, divided, re-arranged, omitted, eliminated and/or implemented in any other way. Further, any or all of the example application 108, cloud computing platform provider 110, the example deployment environments 112, the example virtual machines 114, the example application director 116, the example topology generator 118, the example catalog 120, the example deployment plan generator 122, the example deployment director 124, the example blueprint 126, the example deployment plans 128, the example scaling handler 130, the example cloud interface 132, the example application components 134, the example deployment agent 136, the example local deployment plan 138, the example guest operating system 140, the example repository 142, the example infrastructure platform 144, the example hardware resources 146, the example servers 148, the example storage array network 150, the example virtualization environment 152, and the example addressing and discovery layer 154 may be implemented by hardware, software, firmware and/or any combination of hardware, software and/or firmware. In addition, any or all of the example scaling handler 130, the example deployment monitor 302, the example scale-in handler 304, the example node selector 306, the example dependents identifier 308, the example updater 310, the example resources releaser 312, the example terminator 314, the example verifier 316, the example scale-out handler 320, the example resources handler 322, the example dependents identifier 324, the example updater 326, the example validator 328, the example restorer 330 and/or, more generally, the example scaling handler 130 of FIGS. 1 and 3 may be implemented by hardware, software, firmware and/or any combination of hardware, software and/or firmware. Thus, for example, any of the example application 108, cloud computing platform provider 110, the example deployment environments 112, the example virtual machines 114, the example application director 116, the example topology generator 118, the example catalog 120, the example deployment plan generator 122, the example deployment director 124, the example blueprint 126, the example deployment plans 128, the example scaling handler 130, the example cloud interface 132, the example application components 134, the example deployment agent 136, the example local deployment plan 138, the example guest operating system 140, the example repository 142, the example infrastructure platform 144, the example hardware resources 146, the example servers 148, the example storage array network 150, the example virtualization environment 152, the example addressing and discovery layer 154, the example deployment monitor 302, the example scale-in handler 304, the example node selector 306, the example dependents identifier 308, the example updater 310, the example resources releaser 312, the example terminator 314, the example verifier 316, the example scale-out handler 320, the example resources handler 322, the example dependents identifier 324, the example updater 326, the example validator 328, the example restorer 330 and/or, more generally, the example scaling handler 130 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application 108, cloud computing platform provider 110, the example deployment environments 112, the example virtual machines 114, the example application director 116, the example topology generator 118, the example catalog 120, the example deployment plan generator 122, the example deployment director 124, the example blueprint 126, the example deployment plans 128, the example scaling handler 130, the example cloud interface 132, the example application components 134, the example deployment agent 136, the example local deployment plan 138, the example guest operating system 140, the example repository 142, the example infrastructure platform 144, the example hardware resources 146, the example servers 148, the example storage array network 150, the example virtualization environment 152, the example addressing and discovery layer 154, the example deployment monitor 302, the example scale-in handler 304, the example node selector 306, the example dependents identifier 308, the example updater 310, the example resources releaser 312, the example terminator 314, the example verifier 316, the example scale-out handler 320, the example resources handler 322, the example dependents identifier 324, the example updater 326, the example validator 328, and/or the example restorer 330 is/are hereby expressly defined to include a tangible computer readable storage device or storage disk such as a memory, a digital versatile disk (DVD), a compact disk (CD), a Blu-ray disk, etc. storing the software and/or firmware. Further still, the example scaling handler 130 of FIGS. 1 and 3 may include one or more elements, processes and/or devices in addition to, or instead of, those illustrated in FIG. 3, and/or may include more than one of any or all of the illustrated elements, processes and devices.

Figure 4:
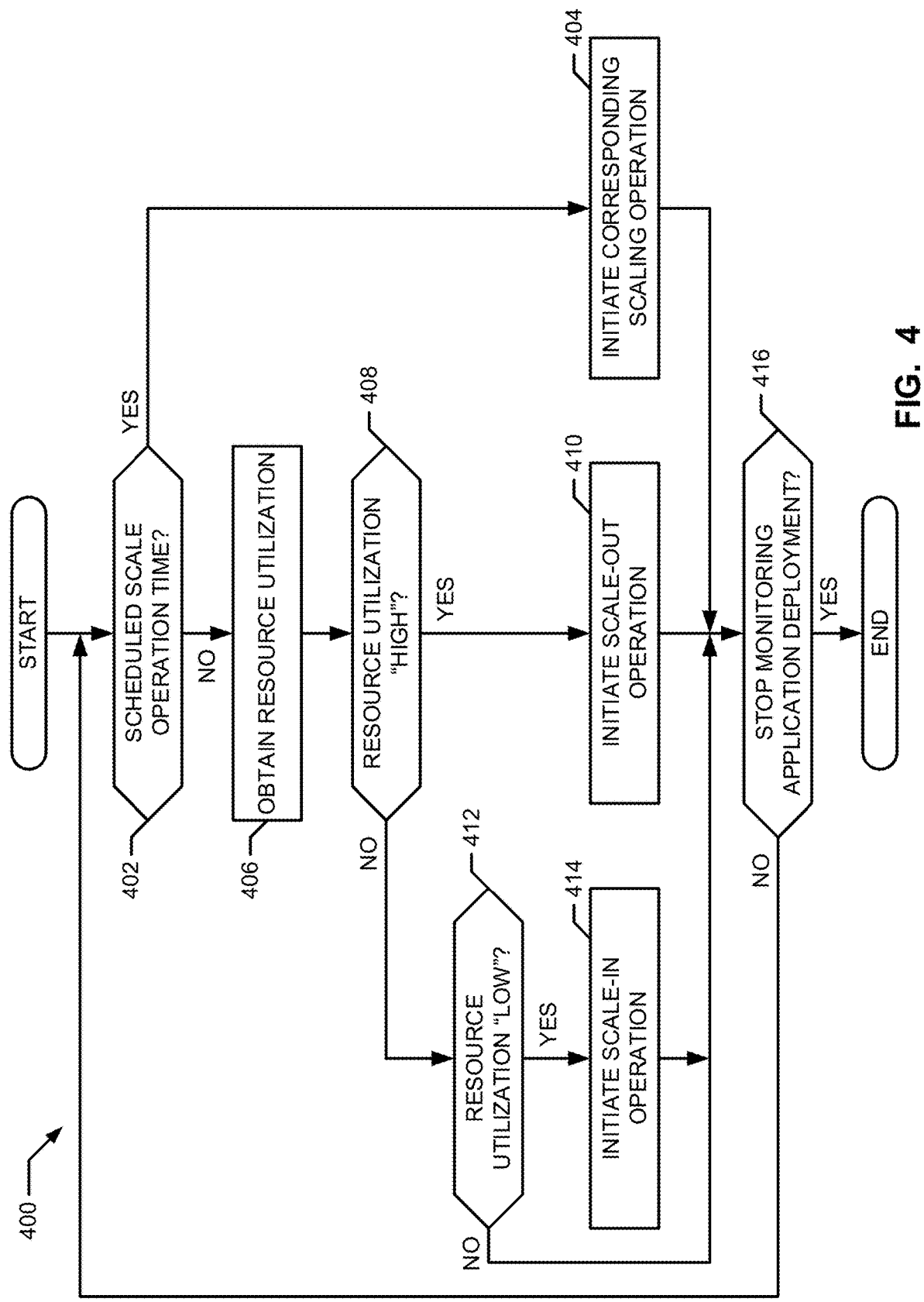
FIG. 4 is a flow chart representative of example machine-readable instructions that may be executed to scale an application deployment in the example cloud computing environment of FIG. 1.
Figure 5:
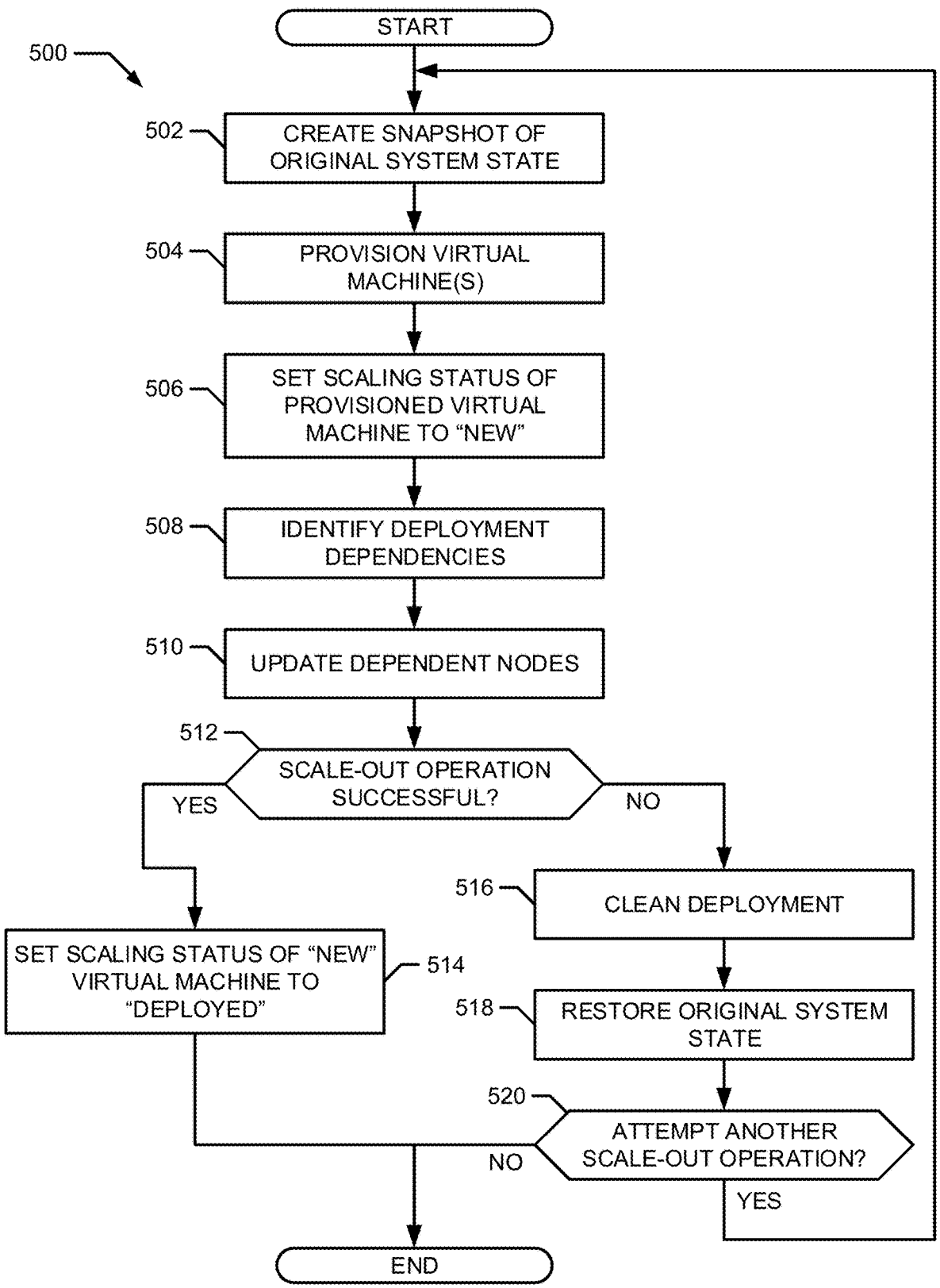
FIG. 5 is a flow chart representative of example machine-readable instructions that may be executed to scale-out an application deployment in the example cloud computing environment of FIG. 1.
Figure 6:
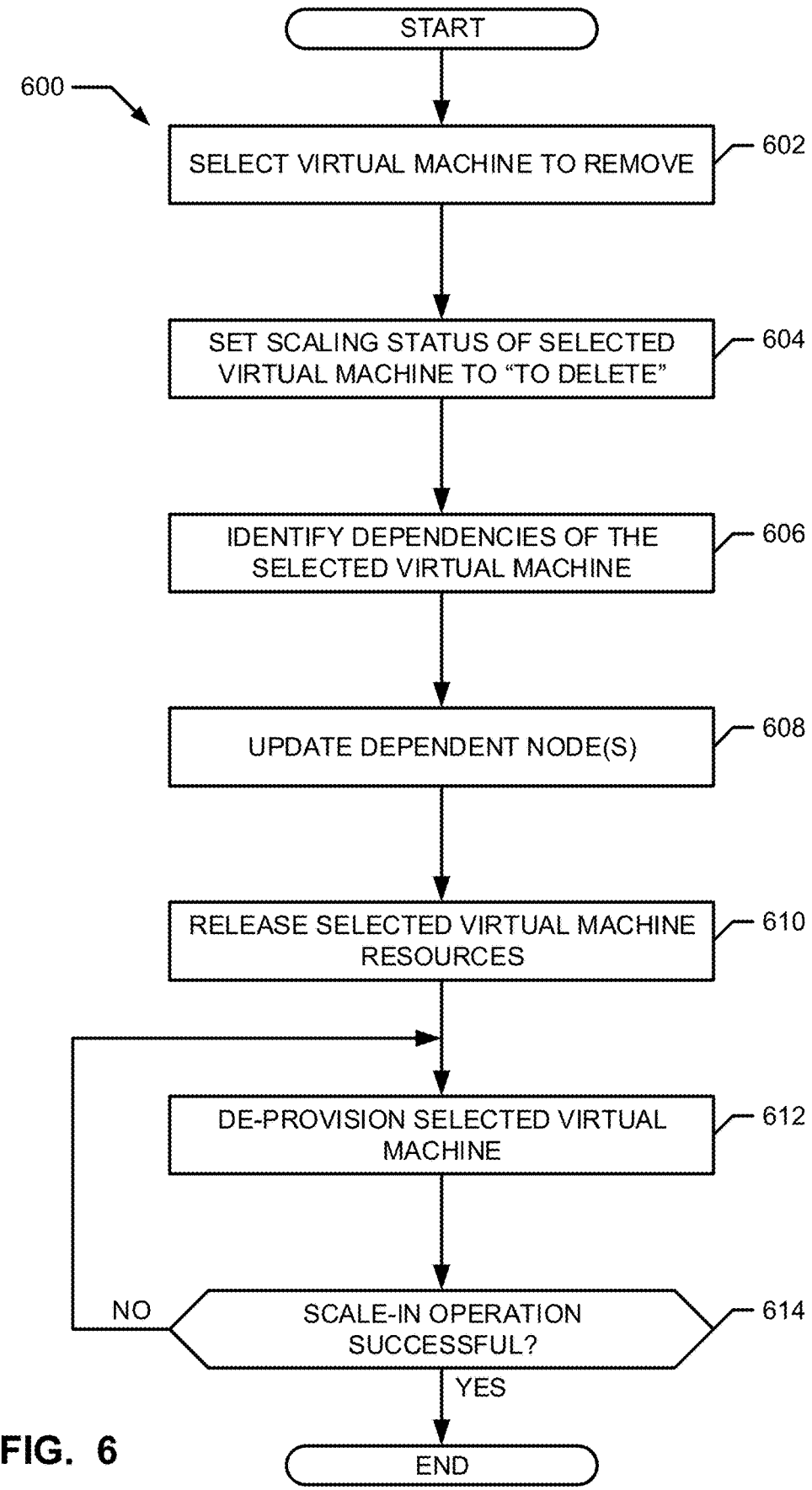
FIG. 6 is a flow chart representative of example machine-readable instructions that may be executed to scale-in an application deployment in the example cloud computing environment of FIG. 1.

Flowcharts representative of example machine readable instructions for implementing the scaling handler 130 of FIGS. 1 and/or 3 are shown in FIGS. 4-6. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 4-6, many other methods of implementing the example scaling handler 130 may alternatively be used. For example, the order of execution of the blocks may be changed, and/or some of the blocks described may be changed, eliminated, or combined.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program of FIG. 4 determines whether to scale an application 108 (FIGS. 1 and/or 3) deployed in a deployment environment 112 (FIGS. 1 and/or 3). The example program of FIG. 4 begins at block 402 when the example deployment monitor 302 (FIG. 3) determines whether a scaling operation is scheduled to be performed. For example, the deployment monitor 302 may compare the current date and/or time to scheduled periods defined for a scale-out operation (e.g., during work hours) and/or a scale-in operation (e.g., over the weekend). If, at block 402, the deployment monitor 302 determines that a scaling operation is scheduled to be performed, then, at block 404, the deployment monitor 302 initiates the corresponding scaling operation. For example, the deployment monitor 302 may send a message to the example scale-in handler 304 (FIG. 3) to schedule a scale-in operation for 5:00 pm on Fridays, and may send a message to the example scale-out handler 320 (FIG. 3) to initiate a scale-out operation for 8:00 am on Mondays. Control then proceeds to block 416 to determine whether to continue monitoring deployment of the application 108 in the deployment environment 112.

If, at block 402, the deployment monitor 302 determines that a scaling operation is not scheduled to be performed, then, at block 406, the deployment monitor 302 obtains resource utilization information for the deployment environment 112. For example, the deployment monitor 302 may monitor and retrieve infrastructure resource consumption levels and requirements (e.g., workload) of the deployed application 108. At block 408, the deployment monitor 302 determines whether the resource utilization for the deployed application 108 is "high." For example, the deployment monitor 302 may compare the deployed application 108 workload to a "high" utilization criterion and/or threshold such as utilization values greater than 75% utilization of available resources. If, at block 408, the deployment monitor 302 determines that the deployed application 108 workload satisfies the "high" utilization criterion and/or threshold, then, at block 410, the deployment monitor 302 initiates a scale-out operation. For example, the deployment monitor 302 may alert the example scale-out handler 320 to increase a cluster node size by two additional virtual machines. Control then proceeds to block 416 to determine whether to continue monitoring deployment of the application 108 in the deployment environment 112.

If, at block 408, the deployment monitor 302 determines that the deployed application 108 workload does not satisfy the "high" utilization criterion and/or threshold, then, at block 412, the deployment monitor 302 determines whether the resource utilization for the deployed application 108 is "low." For example, the deployment monitor 302 may compare the deployed application 108 workload to a "low" utilization criterion and/or threshold such as utilization values less than 25% utilization of available resources. If, at block 412, the deployment monitor 302 determines that the deployed application 108 workload satisfies the "low" utilization criterion and/or threshold, then, at block 414, the deployment monitor 302 initiates a scale-in operation. For example, the deployment monitor 302 may alert the example scale-in handler 304 to decrease a cluster node size by two virtual machines. Control then proceeds to block 416 to determine whether to continue monitoring deployment of the application 108 in the deployment environment 112.

If, at block 412, the deployment monitor 302 determines that the deployed application 108 workload does not satisfy the "low" utilization criterion and/or threshold, or after the deployment monitor 302 initiates a scaling operation at block 404, initiates a scale-out operation at block 410 or initiates a scale-in operation at block 414, then at block 416, the deployment monitor 302 determines whether to stop monitoring deployment of the application 108 in the deployment environment 112. For example, the deployment monitor 302 may receive updated information indicating that the application 108 is being terminated. If, at block 416, the deployment monitor 302 determines to continue monitoring deployment of the application 108 in the deployment environment 112 (e.g., the deployment monitor 302 continues to receive updated resource utilization information, etc.), control returns to block 402 to determine if a scaling operation is scheduled. Otherwise, if, at block 416, the deployment monitor 302 determines to stop monitoring deployment of the application 108 in the deployment environment 112 (e.g., due to a shutdown event, receiving application 108 termination information, etc.), the example process 400 of FIG. 4 then ends.

The example program of FIG. 5 perform a scale-out operation on the application 108 (FIGS. 1 and/or 3) deployed in the deployment environment 112 (FIGS. 1 and/or 3). The example program of FIG. 5 begins at block 502 when the example scale-out handler 320 (FIG. 3) creates a snapshot of the original system state of the deployment environment 112. For example, after the example deployment monitor 302 (FIG. 3) initiates a scale-out operation, the example restorer 330 (FIG. 3) may store configuration name-value pairs of variables, parameters, properties, etc. for components (e.g., application components, code components and/or services) executing in the deployment environment 112. At block 504, the scale-out handler 320 provisions new virtual machines 114 in the deployment environment 112. For example, the example resources handler 322 (FIG. 3) may allocate infrastructure resources to instantiate one or more virtual machines 114 (FIG. 1) in the deployment environment 112, configure the instantiated ones of the virtual machines 114, and cause the instantiated ones of the virtual machines 114 to boot and execute the deployed application 108. At block 506, the resources handler 322 sets the scaling status of the provisioned virtual machine to "new." At block 508, the scale-out handler 320 identifies dependencies between the provisioned virtual machines 114 and nodes deployed in the deployment environment 112. For example, the example dependents identifier 324 (FIG. 3) may parse the application blueprint 126 and/or the deployment plan 128 of the application 108 and identify which, if any, virtual machines and/or nodes to which/from which the provisioned virtual machines 114 obtains information/provides information. At block 510, the scale-out handler 320 updates the one or more dependent nodes to include references to the provisioned virtual machines 114. For example, the example updater 326 (FIG. 3) may provide a load balancer with references such as IP address, hostname, etc. to the provisioned virtual machines 114.

At block 512, the scale-out handler 320 determines whether the scale-out operation was successful. For example, the example validator 328 (FIG. 3) may verify the integrity of the deployment environment 112 by, for example, checking if the deployed application has errors (e.g., whether properties have been correctly specified, whether the deployment includes invalid (e.g., circular) dependencies, etc.). If, at block 512, the validator 328 determines that the scale-out operation was successfully performed, then, at block 514, the validator 328 sets the scaling status of the "new" virtual machines to "deployed," and the example program 500 of FIG. 5 ends.

If, at block 512, the validator 328 determines that the scale-out operation was unsuccessfully performed, then, at block 516, the restorer 330 "cleans" the deployment. For example, the restorer 330 may delete the virtual machines provisioned after the most recent snapshot was created. At block 518, the restorer 330 restores the deployment to its original state. For example, the restorer 330 may utilize the snapshot to restore the configuration name-value pairs of variables, parameters, properties, etc. for the deployed components to their system state prior to attempting the scale-out operation. At block 520, the scale-out handler 320 determines whether to attempt another scale-out operation. For example, the example restorer 330 may check if the number of unsuccessful scale-out operation attempts satisfies a threshold. If, at block 520, the restorer 330 determines not to attempt another scale-out operation (e.g., the number of unsuccessful scale-out operation attempts meets a threshold such as three unsuccessful attempts), then the example program 500 of FIG. 5 ends. Otherwise, if, at block 520, the restorer 330 determines to attempt another scale-out operation, then control returns to block 502 to create an updated snapshot of the deployment.

The example program of FIG. 6 performs a scale-in operation on an application 108 (FIGS. 1 and/or 3) deployed in a deployment environment 112 (FIGS. 1 and/or 3). The example program of FIG. 6 begins at block 602 when the example scale-in handler 304 (FIG. 3) selects a virtual machine to remove from the application 108. For example, after the example deployment monitor 302 (FIG. 3) initiates a scale-in operation, the example node selector 306 (FIG. 3) selects one or more virtual machines 114 to remove from the deployment environment 112. The example node selector 306 of the illustrated example selects the one or more virtual machines 114 using a last-in first-out (LIFO) algorithm, a first-in first-out (FIFO) algorithm, a randomizing algorithm, etc. and/or manual selection. At block 604, the node selector 306 sets the scaling status of the selected virtual machine(s) to "to delete." At block 606, the scale-in handler 304 identifies dependencies of the selected ones of the virtual machines. For example, the example dependents identifier 308 (FIG. 3) may parse the application blueprint 126 and/or the deployment plan 128 of the application 108 and identify which, if any, of the virtual machines 114 and/or nodes communicate with the selected ones of the virtual machines 114. At block 608, the scale-in handler 304 updates the one or more dependent nodes. For example, the example updater 310 (FIG. 3) may remove from a load balancer executing in the deployment environment 112 references such as an IP address, a hostname, etc. to the selected ones of the virtual machines 114. At block 610, the scale-in handler 304 releases resources allocated to the selected ones of the virtual machines 114. For example, the example resources releaser 312 (FIG. 3) may release application-level resources and/or infrastructure-level resources that were used by the selected ones of the virtual machines.

At block 612, the scale-in handler 304 de-provisions the selected ones of the virtual machines 114. For example, the example terminator 314 may cause the selected ones of the virtual machines 114 to be shut down and then may delete the selected ones of the virtual machines 114 from the deployment environment 112. At block 614, the scale-in handler 304 determines whether the scale-in operation was successful. For example, the example verifier 316 (FIG. 3) may verify the integrity of the deployment environment 112 by, for example, checking if the selected ones of the virtual machines 114 was removed from the deployment environment 112, if the deployed application 108 has errors (e.g., whether properties have been correctly specified, whether the deployment includes invalid (e.g., circular) dependencies, etc.). For example, the terminator 314 may be unable to delete the selected ones of the virtual machines due to a connectivity error between the scale-in handler 304 and the deployment environment 112.

If, at block 614, the verifier 316 determines that the scale-in operation was unsuccessful, control returns to block 612 to attempt to de-provision the selected ones of the virtual machines. Otherwise, if, at block 614, the verifier 316 determines that the scale-in operation was successfully performed, then the example program 600 of FIG. 6 ends.

Figure 7:
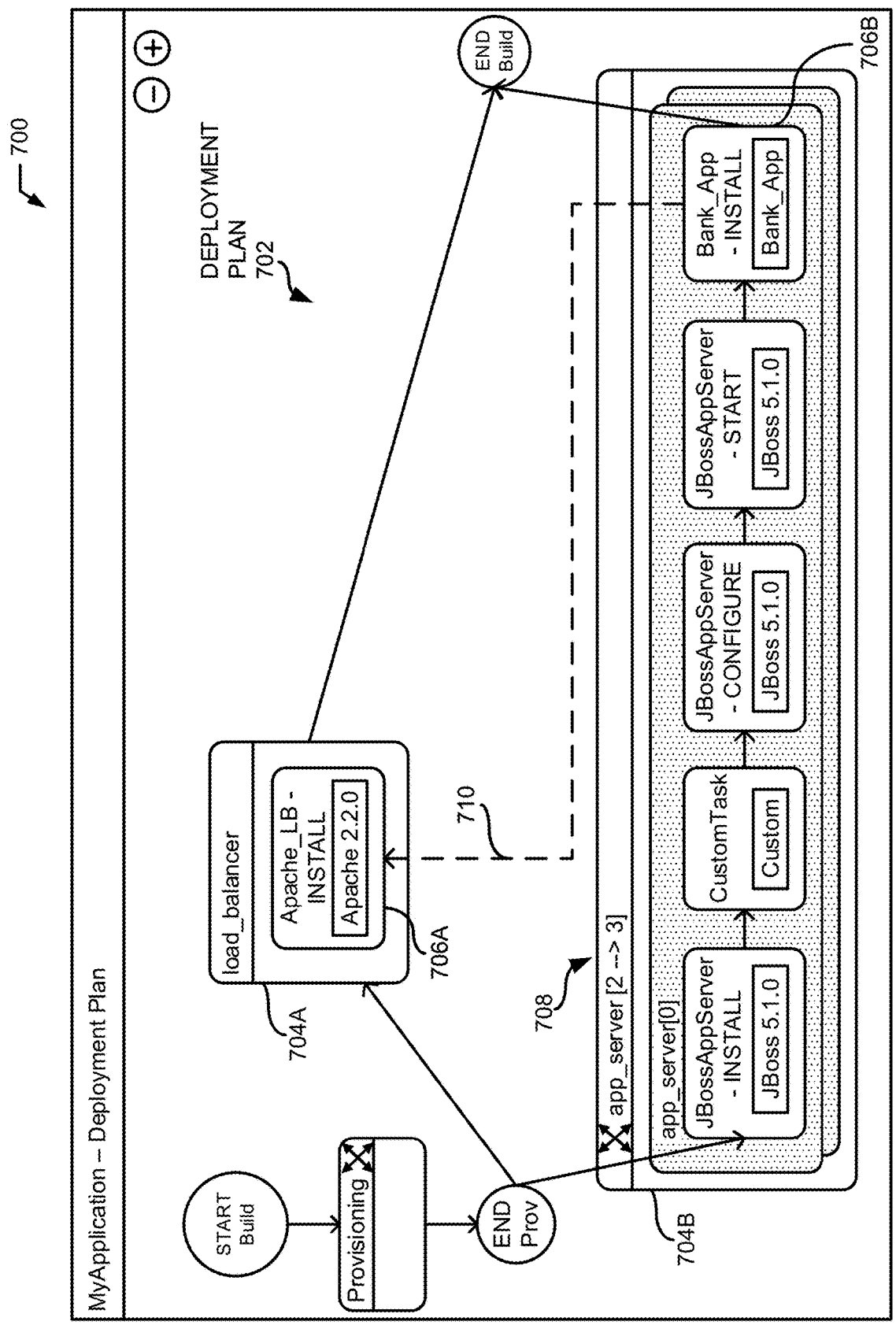
FIG. 7 illustrates an example graphical user interface generated by the example scaling handler of FIGS. 1 and/or 3 to view a deployment plan to scale-out an application deployment in the example cloud computing environment of FIG. 1.

FIG. 7 shows an example user interface 700 that presents an example deployment plan 702, generated by, for example, the example deployment plan generator 122 of FIG. 1, for performing a scale-out operation for an application. In the illustrated example of FIG. 7, the deployment plan 702 includes an example load balancer node 704A including an example task 706A (e.g., "Apache_LB—UPDATE") and an example application server node 704B including an example task 706B (e.g., "bank_app—INSTALL") and an example header 708. In the illustrated example of FIG. 7, the nodes 704A, 704B represent the example virtual machines 114 provisioned in the example deployment environment 112 and the tasks 706A, 706B represent action scripts to be executed on the corresponding virtual machines 114.

In the illustrated example of FIG. 7, the example header 708 indicates that the deployment plan 702 performs a scale-out operation increasing the number of application servers in the deployed application from two application servers to three application servers. The example deployment plan 702 of FIG. 7 also specifies an inter-node dependency between the load balancer node 704A and the application server node 704B, as indicated by a dashed directional line 710. For example, when performing a scale-out operation, the example deployment plan 702 specifies that the example task 706A for updating the load balancer (e.g., "Apache_LB—UPDATE") does not begin execution until the example task 706B for deploying the web application (e.g., "bank_app—INSTALL") is completed. In this manner, when a scale-out operation is performed, the example load balancer node 704A, which is dependent on the example application server node 704B, is updated to include references (e.g., an IP address, a hostname, etc.) to the newly deployed web application (e.g., "bank_app—INSTALL").

Figure 8:
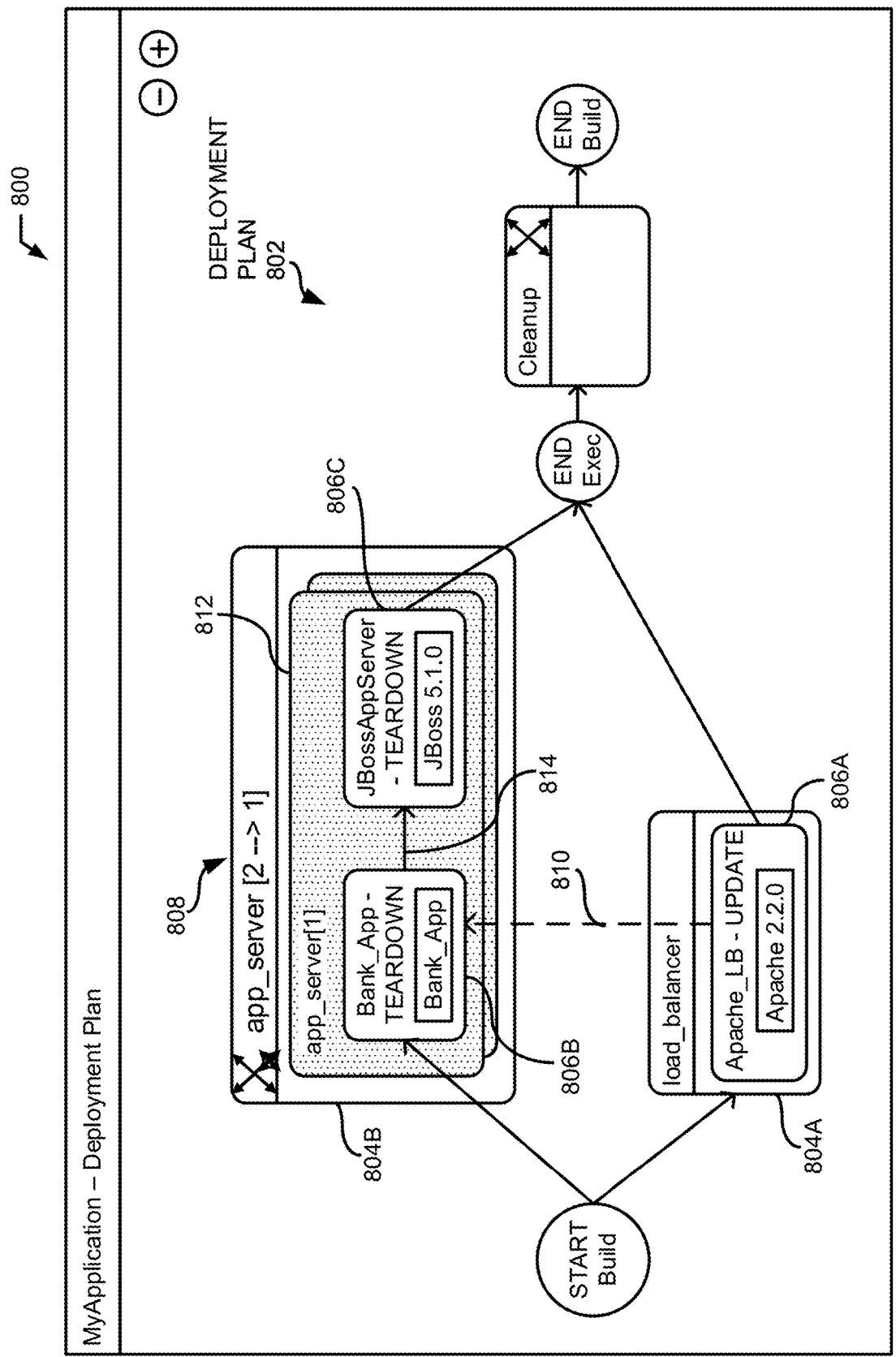
FIG. 8 illustrates an example graphical user interface generated by the example scaling handler of FIGS. 1 and/or 3 to view a deployment plan to scale-in an application deployment in the example cloud computing environment of FIG. 1.

FIG. 8 shows an example user interface 800 for presenting an example deployment plan 802, generated by, for example, the example deployment plan generator 122 of FIG. 1, for performing a scale-in operation for an example application. In the illustrated example of FIG. 8, the deployment plan 802 includes an example load balancer node 804A including an example task 806A (e.g., "Apache_LB—UPDATE") and an example application server node 804B including an example task 706B (e.g., "bank_app—TEARDOWN"), an example task 806C (e.g., "JBossAppServer—TEARDOWN") and an example header 808. In the illustrated example of FIG. 8, the nodes 804A, 804B represent the example virtual machines 114 provisioned in the example deployment environment 112 and the tasks 806A, 806B represent action scripts to be executed on the corresponding virtual machine.

In the illustrated example of FIG. 8, the example header 808 indicates that the deployment plan 802 performs a scale-in operation decreasing the number of application servers in the deployed application from two application servers to one application server. The example deployment plan 802 of FIG. 8 also specifies an inter-node dependency between the load balancer node 804A and the application server node 804B, as indicated by a dashed directional line 810. For example, when performing a scale-in operation, the example deployment plan 802 specifies that the example task 806B for clearing the web application (e.g., "bank_app—TEARDOWN") does not begin execution until the example task 806A for updating the load balancer (e.g., "Apache_LB—UPDATE") is completed. In this manner, when a scale-in operation is performed, the example application server node 804B, which is dependent on the example load balancer node 804A, is updated to remove references (e.g., an IP address, a hostname, etc.) to the selected virtual machine (e.g., an example "app server[1]" 812) prior to deleting the virtual machine 812. The example deployment plan 802 of FIG. 8 also specifies that while performing a scale-in operation, resources associated with the application server (e.g., infrastructure-level resources) are released after resources associated with the web application (e.g., application-level resources) are released. For example, the example task 806C for clearing the application server (e.g., "JBossAppServer—TEARDOWN") does not begin execution until the preceding task 806B (e.g., "bank_app—TEARDOWN"), as indicated by solid directional lines 814, has been completed.

Figure 9:
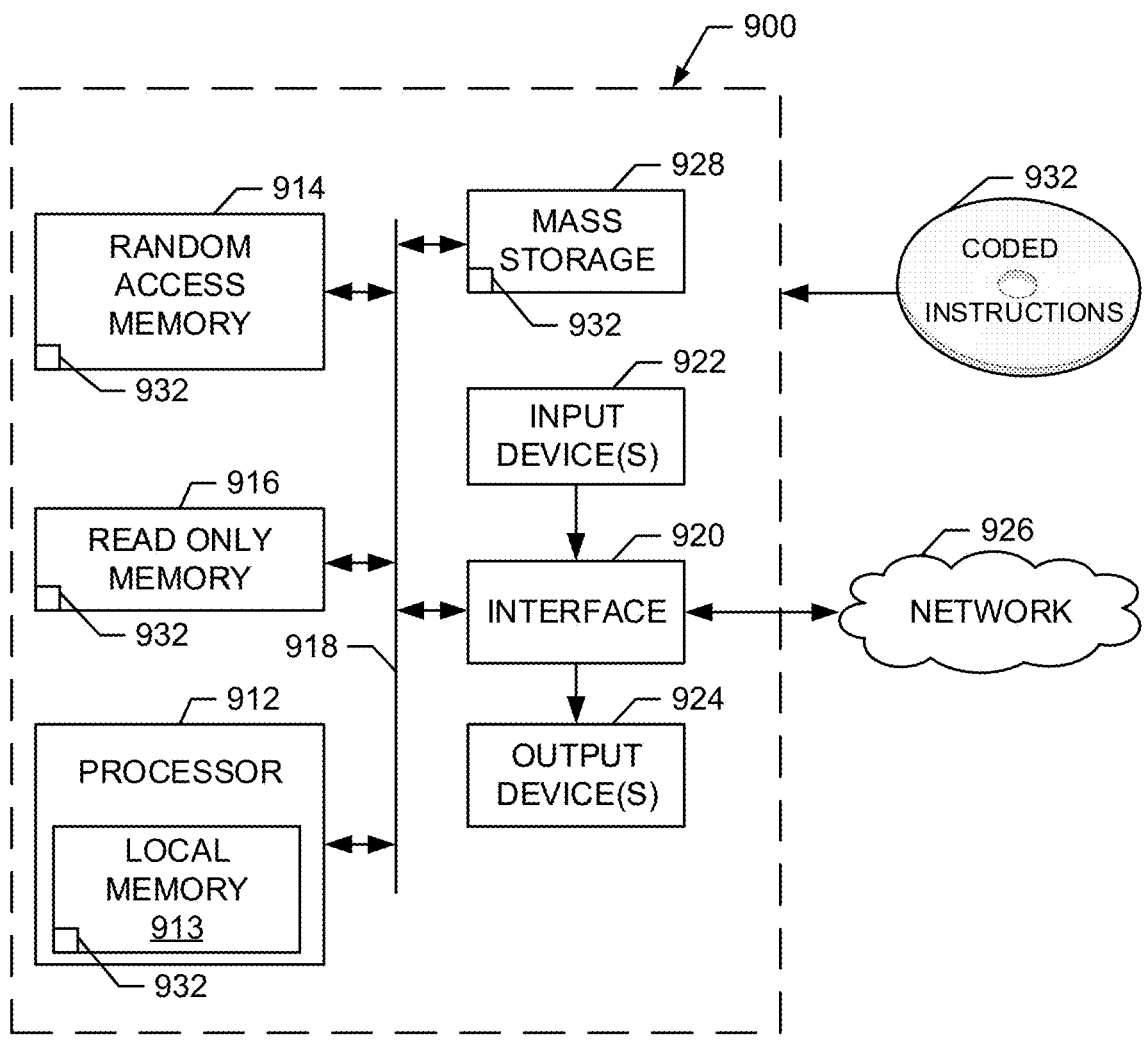
FIG. 9 is a block diagram of an example processing platform capable of executing the example machine readable instructions of FIGS. 4-6 to implement the example application director of FIG. 1, and/or the example scaling handler of FIGS. 1 and 3.

FIG. 9 is a block diagram of an example processor platform 900 capable of executing the instructions of FIGS. 4-6 to implement the scaling handler 130 of FIGS. 1 and 3. The processor platform 900 can be, for example a server, a personal computer or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 4-6 may be stored in the mass storage device 928, in the volatile memory 914, in the non-volatile memory 916, and/or on a removable tangible computer readable storage medium such as a CD or DVD.

From the foregoing, it will appreciate that the above disclosed methods, apparatus and articles of manufacture scale application deployments in cloud computing environments, while updating dependent nodes, and, thereby, preserving the integrity of the application deployment. Disclosed examples update dependencies and deployment orders across multiple applications, and, thereby enabling a deployment to disassociate unnecessary resources during a scale-in operation and allocation necessary resources during a scale-out operation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   memory; and
   at least one hardware processor to execute machine-readable instructions to implement:
   a deployment monitor to initiate a modification of a number of virtual machines deployed in a computing environment, the virtual machines including a first virtual machine to execute a first component of an application deployed in the computing environment, the virtual machines including a second virtual machine to execute a second component of the application;
   a dependents identifier to identify an information dependency, the information dependency to indicate that at least a portion of the second component is performed after at least a portion of the first component, the information dependency to indicate that the first virtual machine is to provide information to the second virtual machine; and
   an updater to update the information dependency based on a scaling status of the first virtual machine, the information dependency including a reference to the first virtual machine.

2. A system as defined in claim 1, wherein the dependents identifier is to identify the information dependency of the second virtual machine by parsing a topology map of the application.

3. A system as defined in claim 1, wherein the deployment monitor is to initiate a scale-out operation in the computing environment.

4. A system as defined in claim 3, wherein the at least one hardware processor is to execute the machine-readable instructions to implement a resource handler to:
   provision the first virtual machine in the computing environment;
   cause the first virtual machine to execute the first component; and
   set the scaling status of the first virtual machine as a new virtual machine.

5. A system as defined in claim 4, wherein the updater is to update the information dependency by adding an indication that the second virtual machine is dependent on information provided by the first virtual machine.

6. A system as defined in claim 3, wherein the at least one hardware processor is to execute the machine-readable instructions to implement a restorer to determine a success status of the scale-out operation by checking communication between the first virtual machine and a third virtual machine deployed in the computing environment, the third virtual machine having been added to the computing environment before the first virtual machine.

7. A system as defined in claim 3, wherein the at least one hardware processor is to execute the machine-readable instructions to implement a resource handler to set the scaling status of the first virtual machine at a first time.

8. A system as defined in claim 7, wherein the at least one hardware processor is to execute the machine-readable instructions to implement:
   a restorer to create a deployment snapshot of the computing environment at a second time, the deployment snapshot to include state information of the first virtual machine and the second virtual machine, the second time to be before the first time; and
   a validator to, in response to a determination that the scale-out operation was unsuccessful:
   delete the first virtual machine; and
   modify the state information of the first virtual machine and the second virtual machine based on the deployment snapshot.

9. A system as defined in claim 7, wherein the at least one hardware processor is to execute the machine-readable instructions to implement a restorer to:
   track a number of unsuccessful scale-out operations; and
   cause the resource handler to provision a third virtual machine in the computing environment when the number of unsuccessful scale-out operations satisfies a threshold.

10. A system as defined in claim 1, wherein the deployment monitor is to initiate a scale-in operation in the computing environment.

11. A system as defined in claim 10, wherein the at least one hardware processor is to execute the machine-readable instructions to implement a node selector to select the first virtual machine, the updater to in response to the selection, update the information dependency by removing the reference to the first virtual machine.

12. A system as defined in claim 10, wherein the at least one hardware processor is to execute the machine-readable instructions to further implement:
   a terminator to delete the first virtual machine; and
   a verifier to determine a success status of the scale-in operation by checking if the computing environment includes the reference to the first virtual machine, the verifier to cause the terminator to repeat the deleting of the first virtual machine when the success status of the scale-in operation was unsuccessful.

13. A non-transitory computer readable storage medium comprising instructions that, when executed, cause one or more processors to at least:
   set a scaling status of a first virtual machine included in an application deployed in a computing environment, the first virtual machine to execute a first component of the application, the computing environment including a second virtual machine to execute a second component of the application, the scaling status of the first virtual machine to indicate a number of virtual machines executing the first component;
   identify an information dependency, the information dependency to indicate that an operation of the second component is performed after an operation of the first component, the information dependency to indicate that the first virtual machine is to provide information to the second virtual machine; and
   update the information dependency based on the scaling status of the first virtual machine, the information dependency including a reference to the first virtual machine.

14. A non-transitory computer readable storage medium as defined in claim 13, wherein the instructions further cause the one or more processors to identify the information dependency of the second virtual machine by parsing a topology map of the application.

15. A non-transitory computer readable storage medium as defined in claim 13, wherein the instructions further cause the one or more processors to perform a scale-out operation to increase the number of virtual machines executing the first component.

16. A non-transitory computer readable storage medium as defined in claim 15, wherein the instructions further cause the one or more processors to set the scaling status of the first virtual machine by:
   provisioning the first virtual machine in the computing environment;

causing the first virtual machine to execute the first component; and identifying the first virtual machine as a new virtual machine.

17. A non-transitory computer readable storage medium as defined in claim 16, wherein the instructions further cause the one or more processors to update the information dependency by adding the reference to the first virtual machine.

18. A non-transitory computer readable storage medium as defined in claim 13, wherein the instructions further cause the one or more processors to perform a scale-in operation to decrease the number of virtual machines executing the first component.

19. A non-transitory computer readable storage medium as defined in claim 18, wherein the instructions further cause the one or more processors to:

select the first virtual machine; and in response to the selection, update the information dependency by removing the reference to the first virtual machine.

20. A method comprising:

setting, by executing an instruction with a hardware processor, a scaling status of a first virtual machine deployed in a computing environment, the first virtual machine executing a first component of an application, the virtual machines including a second virtual machine to execute a second component of the application, the scaling status of the first virtual machine indicating in a number of virtual machines executing the first component;

identifying, by executing an instruction with the hardware processor, an information dependency, the information dependency to indicate that a task of the second component is performed after a task of the first component, the information dependency to indicate that the first virtual machine is to provide information to the second virtual machine; and updating, by executing an instruction with the hardware processor, the information dependency based on the scaling status of the first virtual machine, the information dependency including a reference to the first virtual machine.

* * * * *